US006981026B2

(12) United States Patent
Noda et al.

(10) Patent No.: US 6,981,026 B2
(45) Date of Patent: Dec. 27, 2005

(54) GATEWAY APPARATUS WITH LAC FUNCTION

(75) Inventors: Mitsuhiro Noda, Fujisawa (JP); Susumu Matsui, Machida (JP); Akinori Honda, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 0 days.

(21) Appl. No.: 10/951,856

(22) Filed: Sep. 27, 2004

(65) Prior Publication Data

US 2005/0038865 A1 Feb. 17, 2005

Related U.S. Application Data

(63) Continuation of application No. 10/057,835, filed on Jan. 24, 2002, now Pat. No. 6,816,890.

(30) Foreign Application Priority Data

| May 28, 2001 | (JP) | ............................. 2001-158106 |
| Oct. 30, 2001 | (JP) | ............................. 2001-332775 |

(51) Int. Cl.[7] ............................................. G06F 15/16
(52) U.S. Cl. ..................... 709/213; 709/214; 709/215; 709/216; 709/217
(58) Field of Search ............................. 709/213–217, 709/227; 711/147, 148

(56) References Cited

U.S. PATENT DOCUMENTS

| 6,360,267 B1 * | 3/2002 | Kakiuchi et al. ........... 709/227 |
| 6,449,272 B1 | 9/2002 | Chuah et al. ................ 370/389 |
| 6,463,475 B1 | 10/2002 | Calhoun ....................... 709/227 |
| 6,507,577 B1 | 1/2003 | Mauger et al. ............. 370/356 |
| 6,584,454 B1 * | 6/2003 | Hummel et al. .............. 705/59 |
| 6,654,808 B1 | 11/2003 | Chuah ......................... 709/227 |
| 6,654,823 B2 | 11/2003 | Soejima et al. ............... 710/52 |
| 6,745,224 B1 * | 6/2004 | D'Souza et al. ............ 709/202 |
| 6,757,712 B1 * | 6/2004 | Bastian et al. .............. 709/206 |
| 6,810,417 B2 * | 10/2004 | Lee ............................ 709/220 |

FOREIGN PATENT DOCUMENTS

JP 057072 2/2000

OTHER PUBLICATIONS

Layer Two Tunneling Protocal "L2TP" by Network Working Group dated Aug. 1999.

* cited by examiner

*Primary Examiner*—T Nguyen
(74) *Attorney, Agent, or Firm*—Sofer&Haroun, LLP

(57) ABSTRACT

A gateway apparatus 104 connected to an access network 105 accommodating a plurality of ISP networks 108, and having an LAC function of transferring a PPP frame received from a user terminal to any one of the ISP networks via an L2TP connection set on the access network, includes: a cache server interface 112 for connection to a cache server; and a packet transfer controller (81A to 81C and 87) for selecting a PPP frame in which a Web contents request message is included in a payload field from a stream of PPP frames received from a user terminal, and transferring the request message indicated in the PPP frame to the cache server via the cache server interface.

6 Claims, 25 Drawing Sheets

FIG. 5A

| 201 | 202 | 203 | 204 | 205 | 206 | 207 | 208 |
|---|---|---|---|---|---|---|---|
| FLAG | ADDRESS | CONTROL | PROTOCOL | INFORMATION | PAD | FCS | FLAG |
| 7Eh (1 BYTE) | FFh (1 BYTE) | 03h (1 BYTE) | (1 OR 2 BYTES) | (0~MRU BYTES) | | (2 OR 4 BYTES) | 7Eh (1 BYTE) |

FIG. 5B

| | PROTOCOL | PROTOCOL IDENTIFICATION VALUE (HEXADECIMAL NOTATION) |
|---|---|---|
| NETWORK (0000h~3FFFh) | IP (INTERNET PROTOCOL) | 0021h |
| | APPLE TALK | 0029h |
| | NOVELL IPX | 002Bh |
| NETWORK CONTROL (8000h~BFFFh) | IPCP (INTERNET PROTOCOL CONTROL PROTOCOL) | 8021h |
| | APPLE TALK CONTROL PROTOCOL | 8029h |
| | NOVELL IPX CONTROL PROTOCOL | 802Bh |
| DATA LINK CONTROL (C000h~FFFFh) | LCP (LINK CONTROL PROTOCOL) | C021h |
| | PAP (PASSWORD AUTHENTICATION PROTOCOL) | C023h |
| | CHAP (CHALLENGE HANDSHAKE AUTHENTICATION PROTOCOL) | C223h |

| IP HEADER | DESTINATION IP ADDRESS (DA) | SOURCE IP ADDRESS (SA) |
|---|---|---|
| IP (a) | WEB SERVER | USER TERMINAL |
| IP (b) | LNS | LAC |
| IP (c) | USER TERMINAL | WEB SERVER |
| IP (d) | LAC | LNS |

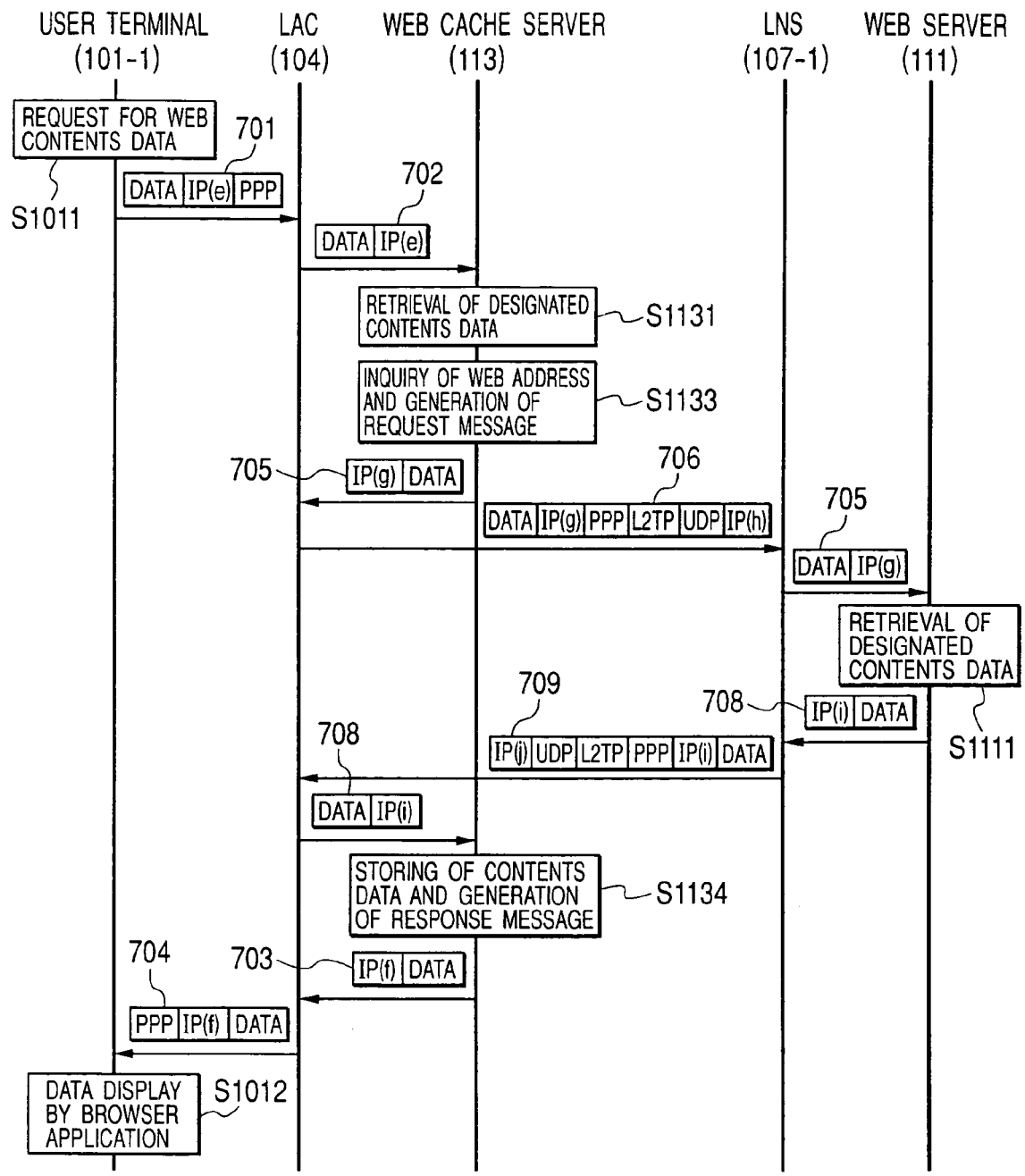

FIG. 13

USER TERMINAL INFORMATION MANAGEMENT TABLE 830

| USER TERMINAL IP ADDRESS | ID OF PPP CONNECTION BETWEEN USER TERMINAL AND LNS | ISP OF USER | LCP CONFIGURATION OPTION ||  L2TP CONNECTION ||
|---|---|---|---|---|---|---|
| | | | PROTOCOL FIELD COMPRESSION | ADDRESS AND CONTROL FIELD COMPRESSION | TUNNEL ID | SESSION ID |
| 215.10.0.8 | 1 | ISP-1 | DISABLED | DISABLED | 1 | 4 |
| 220.5.0.15 | 2 | ISP-2 | ENABLED | ENABLED | 2 | 10 |
| ... | ... | ... | ... | ... | ... | ... |

ISP INFORMATION MANAGEMENT TABLE 840

| ISP | IP ADDRESS ASSIGNED TO WEB CACHE SERVER | LNS IP ADDRESS | ID OF PPP CONNECTION BETWEEN LAC AND LNS | LCP CONFIGURATION OPTION || L2TP CONNECTION ||
|---|---|---|---|---|---|---|---|
| | | | | PROTOCOL FIELD COMPRESSION | ADDRESS AND CONTROL FIELD COMPRESSION | TUNNEL ID | SESSION ID |
| ISP-1 | 210.10.10.1 | 192.168.0.1 | 10001 | DISABLED | DISABLED | 1 | 1 |
| ISP-2 | 210.10.10.2 | 192.168.0.2 | 10002 | DISABLED | DISABLED | 2 | 1 |
| ... | ... | ... | ... | ... | ... | ... | ... |

841, 842, 843, 844, 845, 846

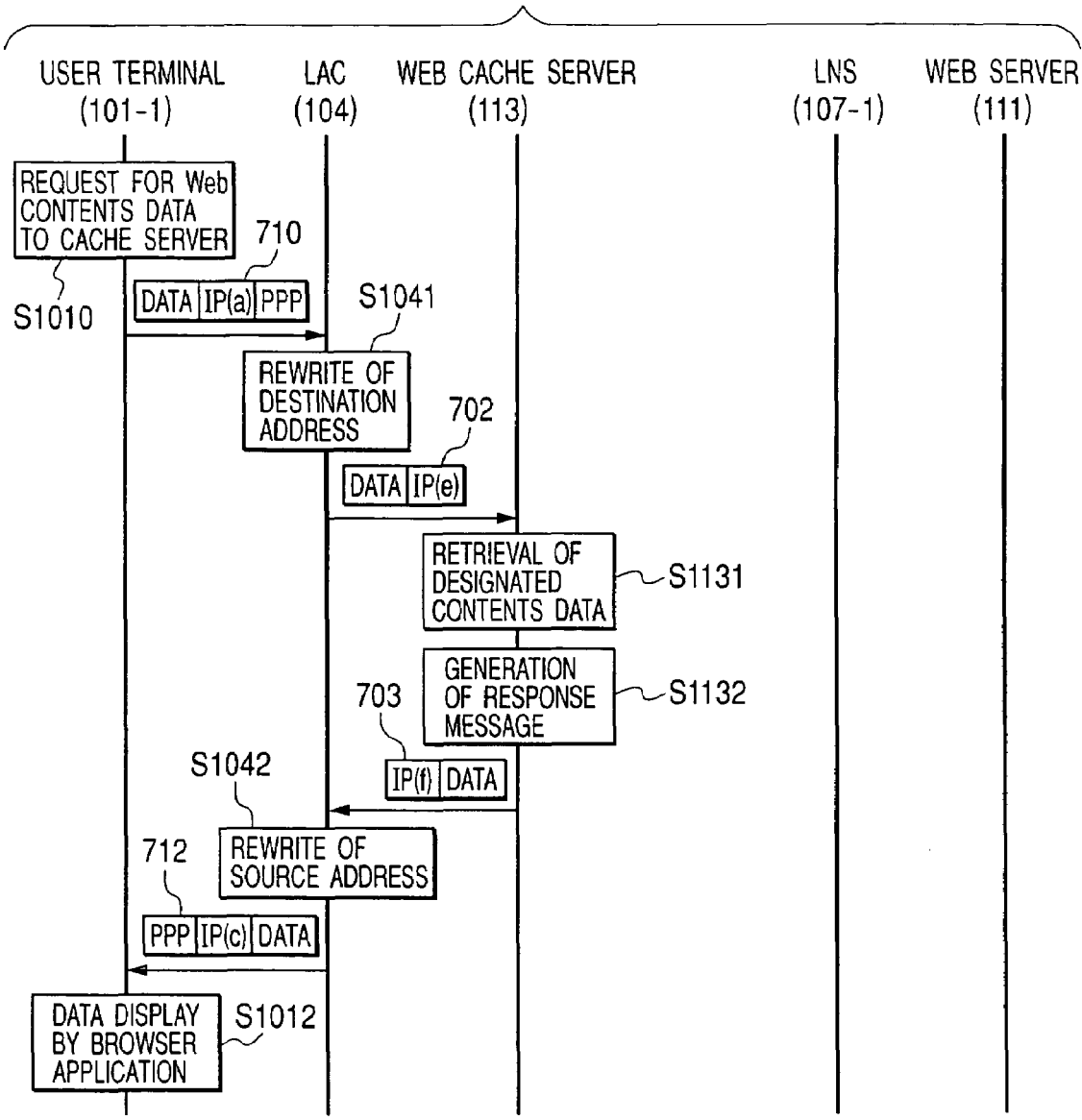

FIG. 23B

| IP HEADER | DESTINATION IP ADDRESS (DA) | SOURCE IP ADDRESS (SA) |
|---|---|---|
| IP (a) | WEB SERVER | USER TERMINAL |
| IP (e) | WEB CACHE SERVER | USER TERMINAL |
| IP (f) | USER TERMINAL | WEB CACHE SERVER |
| IP (c) | USER TERMINAL | WEB SERVER |
| IP (g) | WEB SERVER | WEB CACHE SERVER |
| IP (h) | LNS | LAC |
| IP (i) | WEB CACHE SERVER | WEB SERVER |
| IP (j) | LNS | LAC |

FIG. 24

HTTP REQUEST MESSAGE MANAGEMENT TABLE 850

| PPP CONNECTION ID (851) | HTTP REQUEST MESSAGE | |
|---|---|---|
| | TCP/UDP SOURCE PORT NO. (852) | DESTINATION IP ADDRESS (853) |
| 1 | 1030 | 200.10.0.5 |
| 2 | 1040 | 222.4.8.31 |
| 1 | 1031 | 223.12.6.18 |
| ⋮ | ⋮ | ⋮ |

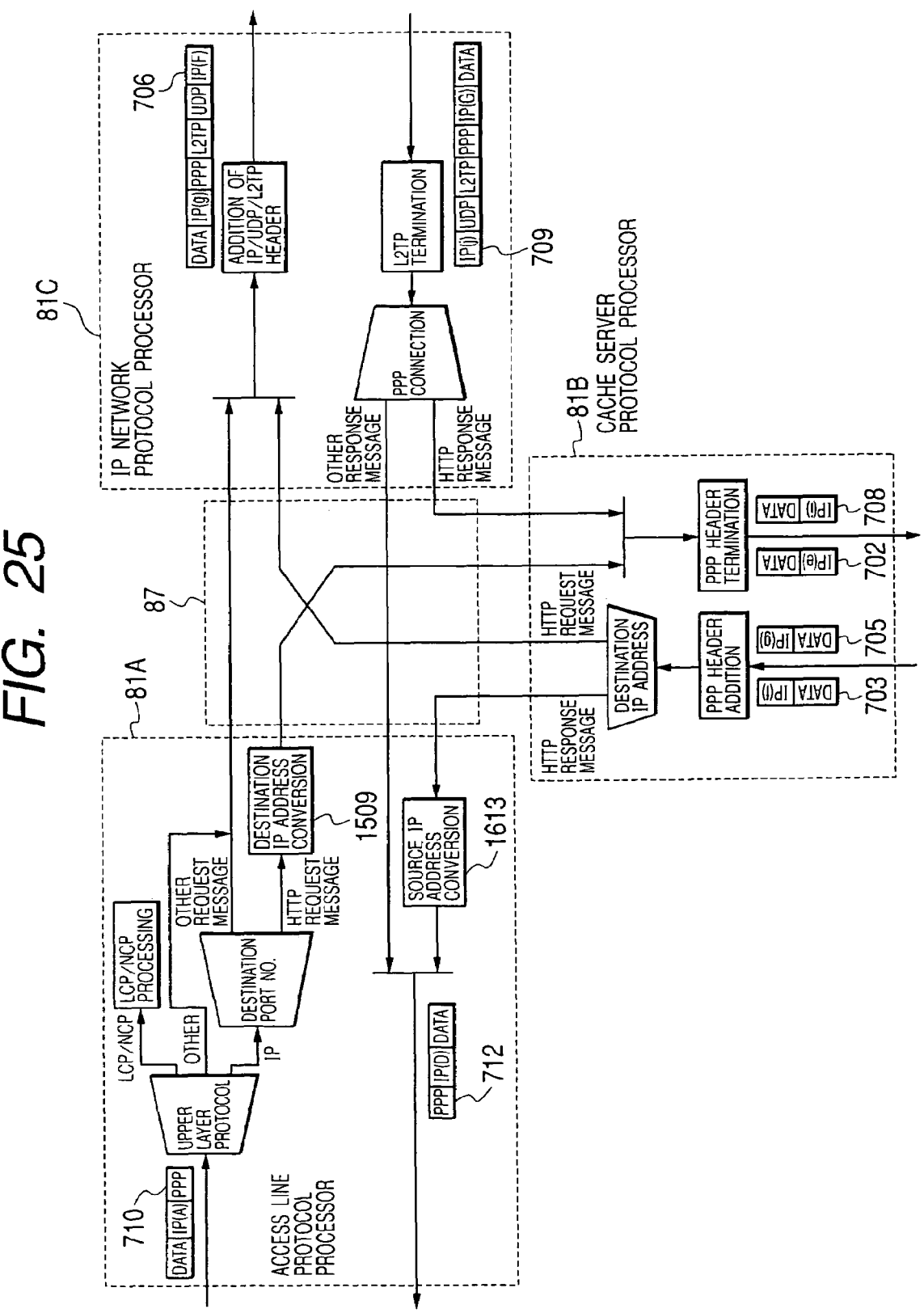

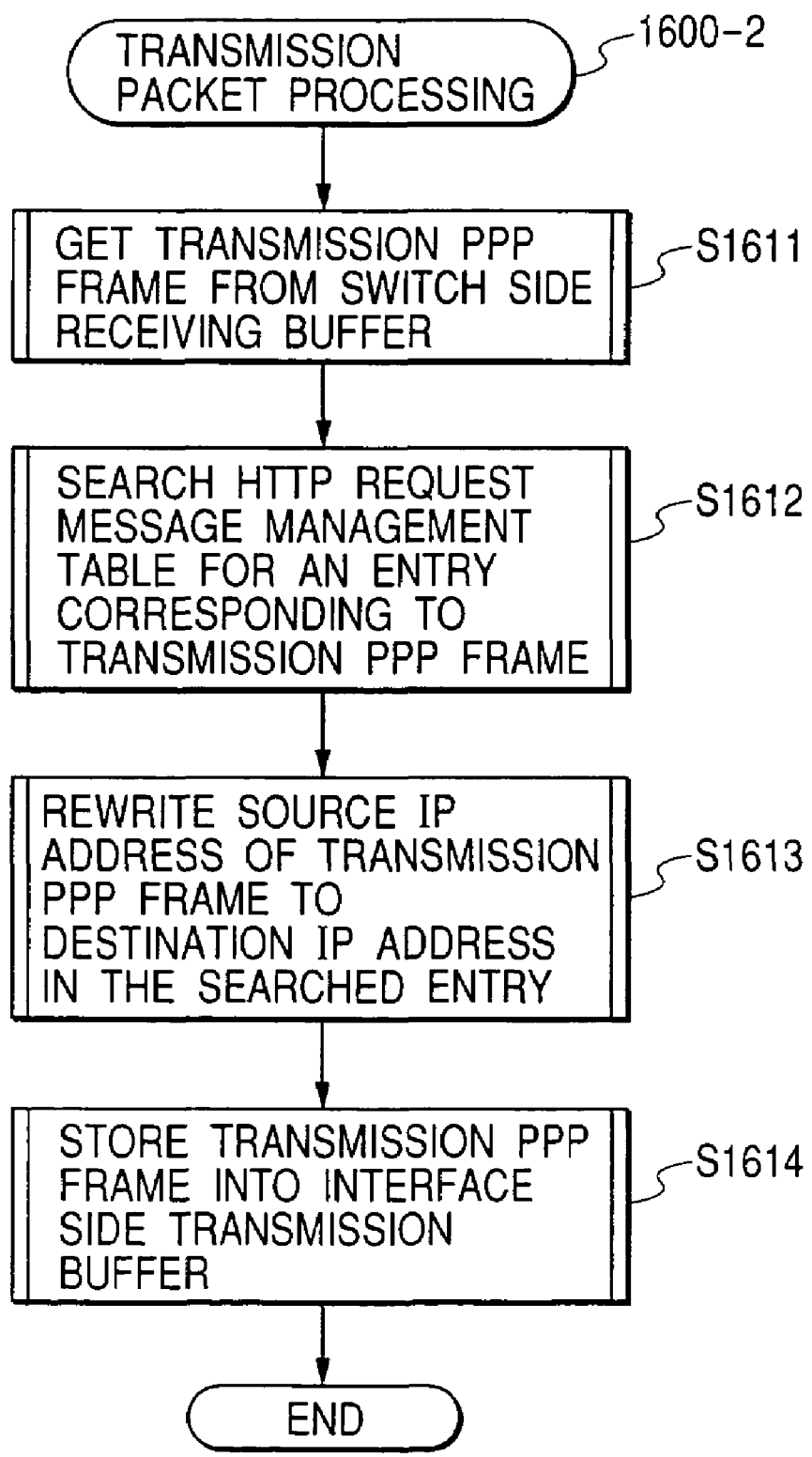

GATEWAY APPARATUS WITH LAC FUNCTION

RELATED APPLICATION

This is a continuation application of allowed U.S. patent application Ser. No. 10/057,835, filed on Jan. 24, 2002 now U.S. Pat. No. 6,816,890, which in turn claims the benefit of priority to Japanese Patent Application 2001-158106, filed on May 28, 2001 and Japanese Patent Application No. 2001-332755, filed on Oct. 30, 2001, the entirety of which are incorporated herein by reference.

BACKGROUND OF THE INVENTION (1) Field of the Invention

The present invention relates to a gateway apparatus to be connected to a plurality of user terminals, more particularly, to a gateway apparatus with an LAC (L2TP Access Concentrator) function to be applied to an ISP (Internet Service Provider) selection type IP network connecting a plurality of ISP networks connected to the Internet by an access network, in which a user terminal accesses the Internet via the access network and any of the ISP networks.

(2) Description of the Related Art

In nowadays where 70% or more of Internet traffic is occupied by Web access traffic, aiming at increasing the speed of Web access from user terminals and reducing traffic on a network connecting user terminals and Web servers, Web caching is being actively studied.

In the Web caching technology, a Web cache server (or Web caching server) is connected to an access network accommodating user terminals, a part of contents data provided by a Web server is stored as cache data in the Web cache server, and the contents data is distributed from the Web cache server in place of the Web server to the user terminals, thereby realizing increase in speed of an access to the Web from a user terminal and reduction in traffic on a core network to which the Web server is connected.

Conventionally, in the field of a network for accessing the Internet, each ISP has its own access points distributed in its service areas. Recently, an. ISP selection type IP network is becoming promising, in which a plurality of ISP networks are connected to a regional IP network (or wide area IP network) managed by a communication carrier, gateway apparatuses as access points commonly used by the plurality of ISPs are disposed on the regional IP network, and user terminals connected to each of the access points are selectively connected to any one of the ISP networks.

In the ISP selection type IP network, a gateway apparatus called an LAC (L2TP Access Concentrator) is installed at a connection point between the regional IP network as an access network and user terminals, and a gateway apparatus called an LNS (L2TP Network Server) is installed at a connection point between the regional IP network and each of ISP networks.

A user terminal accessing the Web establishes a PPP connection between the user terminal and the LAC. The PPP connection is extended to an ISP network designated by the user through an L2TP connection established between the LAC and the LNS.

Specifically, at the time of establishing the PPP connection, when user ID and the identifier of a terminating ISP are input from the user terminal, the LAC connected to the user terminal specifies an LNS corresponding to the terminating ISP on the basis of the ISP identifier, and extends the PPP connection established between the user terminal and the LAC to the specified LNS through the L2TP connection established between the LAC and the LNS. The LNS authenticates the user ID of the terminal user and determines whether the user terminal and the ISP can be connected to each other or not.

The extension of the PPP connection according to the L2TP and the functions of the LAC and LNS are described in the IETF draft RFC2661.

SUMMARY OF THE INVENTION

In the ISP selection type IP network, in order to reduce communication cost in the access network (regional IP network or wide area IP network) connecting the LAC and each of the LNSs, the traffic between the LAC and each of the LNSs is demanded to be lessened as much as possible.

To reduce the traffic on the access network, for example, such a network configuration may be useful in which a Web cache server connected to each LNS on a conventional network is located on the LAC side so as to respond to a Web access from each of user terminals at the entrance of the access network.

In the conventional access network of the L2TP type, however, IP packets transmitted from the user terminal are transferred via a preset PPP connection to the connection end, so that a specific IP packet cannot be branched in some midpoint of the PPP connection.

In other words, the conventional gateway apparatus operative as an LAC simply relays a received PPP frame including an IP packet transmitted from the user terminal to the access network side through the PPP connection and does not have a function of processing the received packet at the IP level. Consequently, in the conventional technique, it is impossible to transfer a Web access request to the Web cache server at the entrance of the access network and respond to the access request from the Web cache server.

An object of the invention is to provide a gateway apparatus operative as an LAC capable of reducing the Web traffic in an access network of an ISP selection type IP network.

Another object of the invention is to provide a gateway apparatus operative as an LAC with the function of taking IP packets for Web traffic from a PPP connection and transferring the IP packets to a Web cache server.

To achieve the objects, the invention provides a gateway apparatus connected to an access network accommodating at least one ISP (Internet Service Provider) network connected to the Internet, and having an LAC (L2TP Access Concentrator) function of transferring a PPP (Point to Point Protocol) frame received from a user terminal to the ISP network via an L2TP (Layer 2 Tunneling Protocol) connection established on the access network, including:

a cache server interface for communicating a packet with a cache server for storing, as cache data, a part of contents data provided by a Web server connected to the Internet; and packet transfer controller for selecting a PPP frame in which a Web contents request message is included in a payload field from a stream of PPP frames received from a user terminal, transferring the request message indicated in the PPP frame to the cache server via the cache server interface, and transferring a response message in a PPP frame format, received from the cache server via the cache server interface to the user terminal requesting the Web contents.

The invention also provides a gateway apparatus connected to an access network accommodating a plurality of ISP networks connected to the Internet and having an LAC function of transferring a PPP frame received from a user terminal to any one of the ISP networks corresponding to an ISP subscribed by the user of the user terminal via an L2TP connection established on the access network, including:

a cache server interface for communicating a packet with a cache server for storing, as cache data, a part of contents data provided by a Web server connected to the Internet; and packet transfer controller for selecting a PPP frame in which a Web contents request message is included in a payload field from a plurality of PPP frames received from a plurality of user terminals subscribing different ISPs, transferring the request message indicated in the PPP frame to the cache server via the cache server interface, and transferring an IP packet in a PPP frame format, including a response message received from the cache server via the cache server interface to the user terminal requesting the Web contents.

In a first embodiment of the invention, the packet transfer controller identifies the PPP frame including the Web contents request message by checking the relation between a destination address of an IP header included in each of the PPP frames received from the user terminal and a specific IP address assigned to the cache server.

In another embodiment of the invention, the packet transfer controller identifies the PPP frame including the Web contents request message by checking an upper layer protocol of an IP packet included in each of the PPP frames received from the user terminal. For example, a port number in a TCP (Transmission Control Protocol) or UDP (Use Datagram Protocol) of an IP packet included in each of the PPP frames is checked, and a received PPP frame whose port number is "80" indicative of HTTP (Hyper Text Transfer Protocol) is determined as a PPP frame for a Web contents request message.

The other objects and features of the invention will become apparent from the following description of the embodiments of the invention.

BRIEF DESCRIPTION OF THE DRAWINGS

FIG. 5A shows the format of a PPP frame and FIG. 5B is a diagram showing representative identification values to be set in a protocol field of the PPP frame.

FIG. 8A shows a packet transfer sequence used in the case where Web contents data requested by the user terminal does not exist in the cache server in an ISP selection type network system to which the gateway apparatus of the first embodiment of the invention is applied as an LAC; and FIG. 8B is a diagram showing the relation between the destination address DA and the source address of an IP header attached to each of transfer packets of FIG. 8A.

FIG. 13 is a diagram showing an example of a user terminal information management table 830 of each of the protocol processors 81 (81A to 81C).

FIG. 14 is a diagram showing an example of an ISP information management table 840 of each of the protocol processors 81 (81A to 81C).

FIG. 22A shows a packet transfer sequence used in the case where Web contents data requested by the user terminal exists in the cache server in an ISP selection type network system to which a gateway apparatus of a second embodiment of the invention is applied as an LAC; and FIG. 22B is a diagram showing the relation between the destination address DA and the source address SA of an IP header attached to each of transfer packets of FIG. 22A.

FIG. 23B is a diagram showing the relation between the destination address DA and the source address SA of an IP header attached to each of transfer packets of FIG. 23A.

FIG. 24 is a diagram showing an example of an HTTP request message management table 850 of the access line protocol processor 81A in the second embodiment of the invention.

FIG. 25 is a diagram for explaining the flow of data in the gateway apparatus (LAC) of the second embodiment of the invention.

FIG. 27 is a flowchart showing an example of a transmission packet processing routine 1600-2 executed by the access line protocol processor 81A in the gateway apparatus of the second embodiment of the invention.

DESCRIPTION OF THE PREFERRED EMBODIMENTS

Embodiments of the invention will be described hereinbelow with reference to the drawings.

A first embodiment of the invention is characterized in that, in an ISP selection type IP network system in which packet communication between an LAC and each of LNSs is carried out in accordance with L2TP, a web cache server is connected to a gateway apparatus functioning as the LAC, and IP packets for Web traffic transmitted from user terminals are transferred from the gateway apparatus to the Web cache server by a proxy address presetting method.

Figure 1:
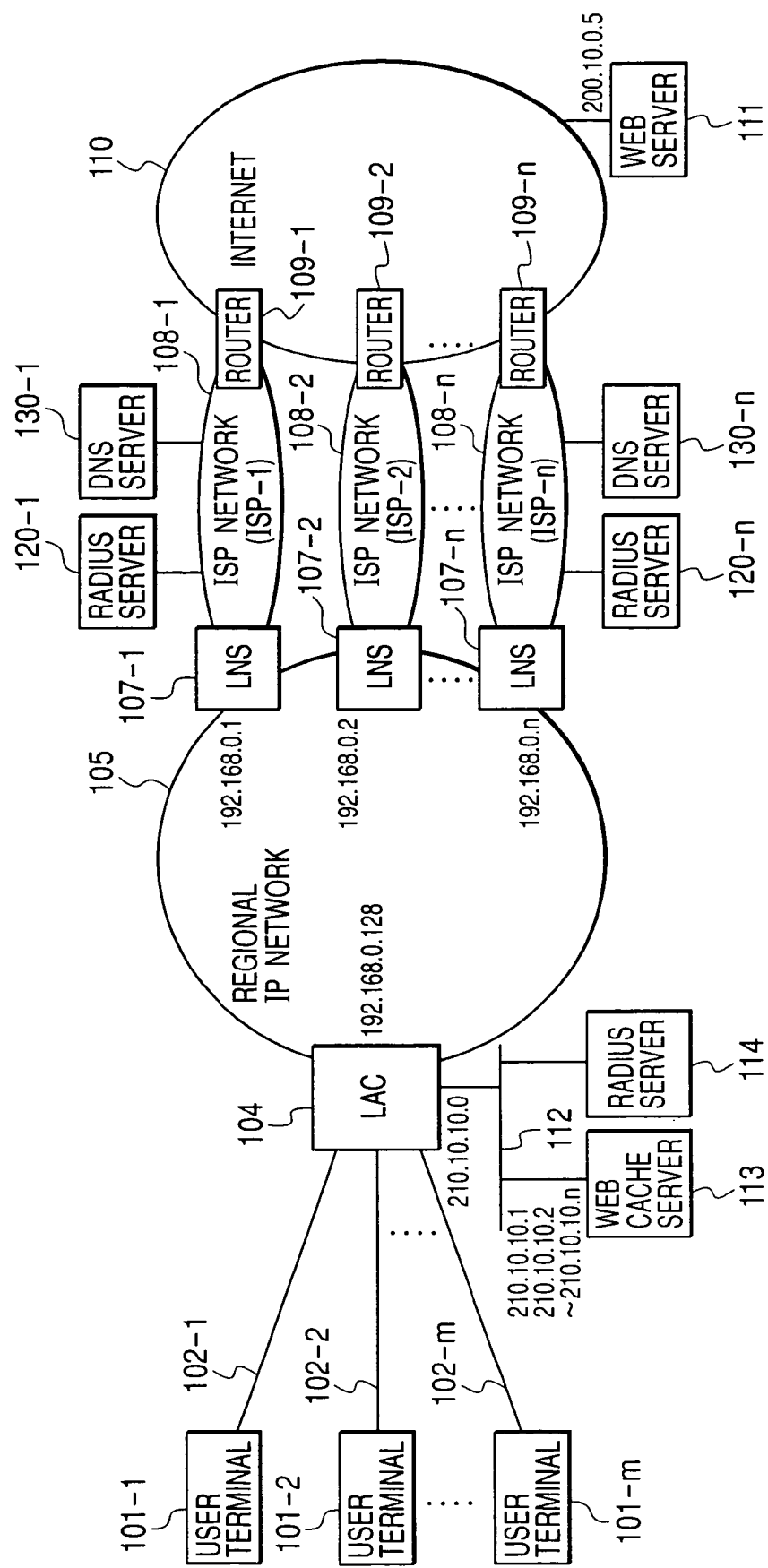
FIG. 1 is a diagram showing an example of an ISP selection type network system to which a gateway apparatus (LAC) of the invention is applied.

FIG. 1 shows an example of an ISP selection type IP network system to which a gateway apparatus of the invention is applied as an LAC 104.

The LAC (gateway apparatus of the invention) 104 is, for example, connected to a plurality of user terminals 101-1 to 101-m via access lines 102-1 to 102-m such as telephone network, ADSL, and CATV, and connected to a plurality of LNSs 107-1 to 107-n via a regional IP network (or wide area IP network) 105. The LNSs 107-1 to 107-n are connected to ISP networks 108-1 to 108-n, respectively. The ISP networks 108-1 to 108-n are connected to the Internet 110 via routers 109-1 to 109-n, respectively. Although only one Web server 111 is shown here, a plurality of servers such as mail server and other Web servers which can be accessed by the user terminals are connected to the Internet 110.

To the ISP networks 108-1 to 108-n, RADIUS (Remote Authentication Dial In User Service) servers 120-1 to 120-n for authenticating ISP members, DNS (Domain Name System) servers 130-1 to 130-n for retrieving an IP address from a host name, and a not-illustrated DHCP (Dynamic Host Configuration Protocol) server are connected. To the LAC 104, a Web cache server 113 and an RADIUS server 114 for performing preliminary authentication of each user are also connected via an LAN 112.

To the LAC 104 and LNS 107-1 to 107-n connected to the regional IP network 105 as an Internet access network, IP addresses "192.168.0.128" and "192.168.0.1" to "192.168.0.n" necessary for routing packets in the regional IP network 105 are assigned. To the Web cache server 113, an IP address corresponding to each of the ISPs (ISP networks and RADIUS servers) is assigned. In the example shown in the drawing, a plurality of IP addresses ("210.10.10.1" to "210.10.10.n") corresponding to the ISP networks 108-1 to 108-n are assigned to the Web cache server 113. As will be described hereinlater, when the Web cache server 113 obtains Web contents requested by a user from the Web server 111, the source address of an HTTP request message (IP packet) to be transmitted to the Web server is properly changed according to the ISP of the requester.

Although only one LAC 104 is shown in FIG. 1, a number of LACs each accommodating a plurality of user terminals are connected to the actual regional IP network 105.

Figure 2:
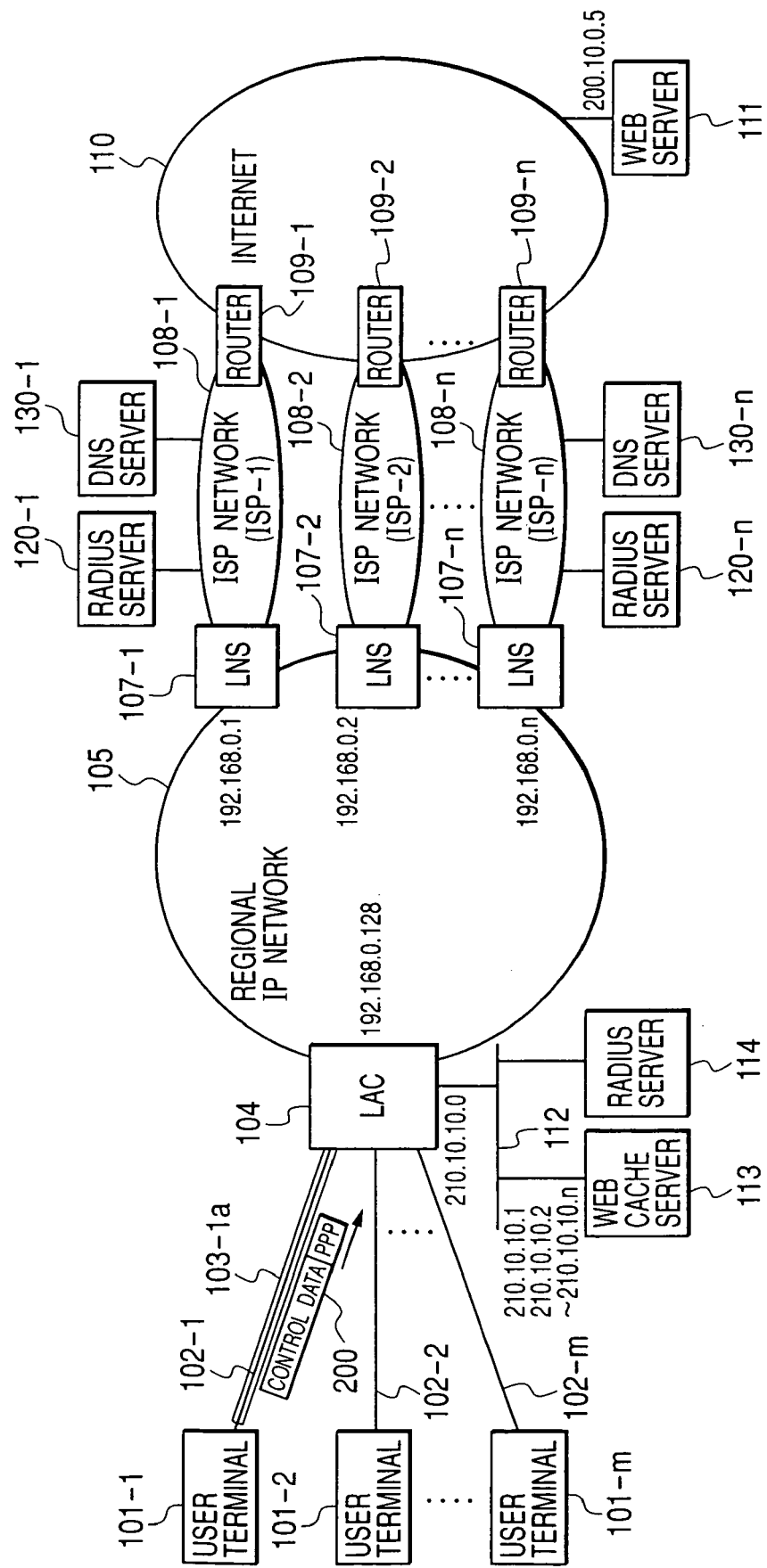
FIG. 2 is a diagram showing a state where a PPP connection is established between a user terminal and the LAC in the ISP selection type network system.
Figure 3:
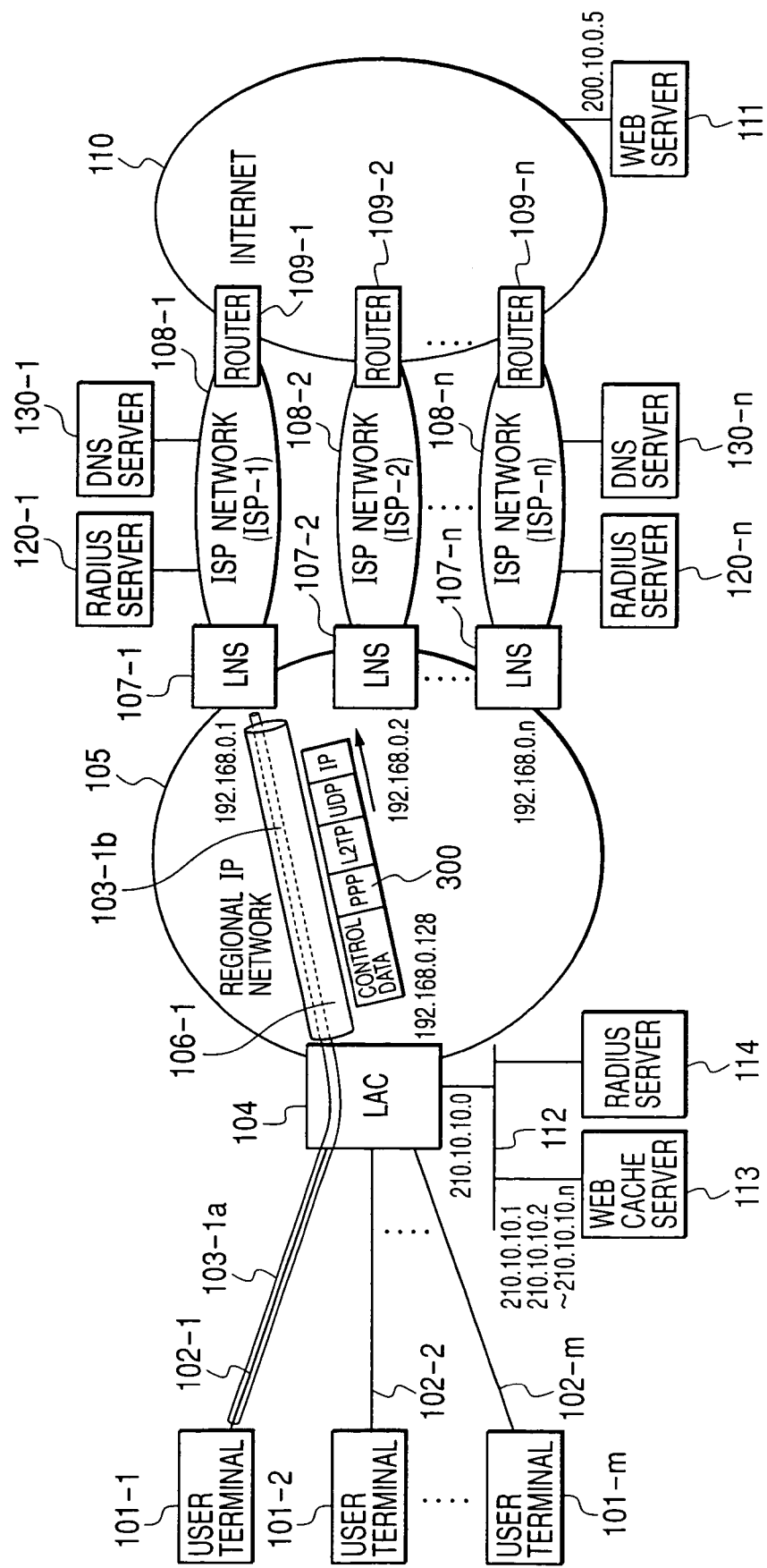
FIG. 3 is a diagram showing a state where the PPP connection is extended to an LNS in the ISP selection type network system.
Figure 4:
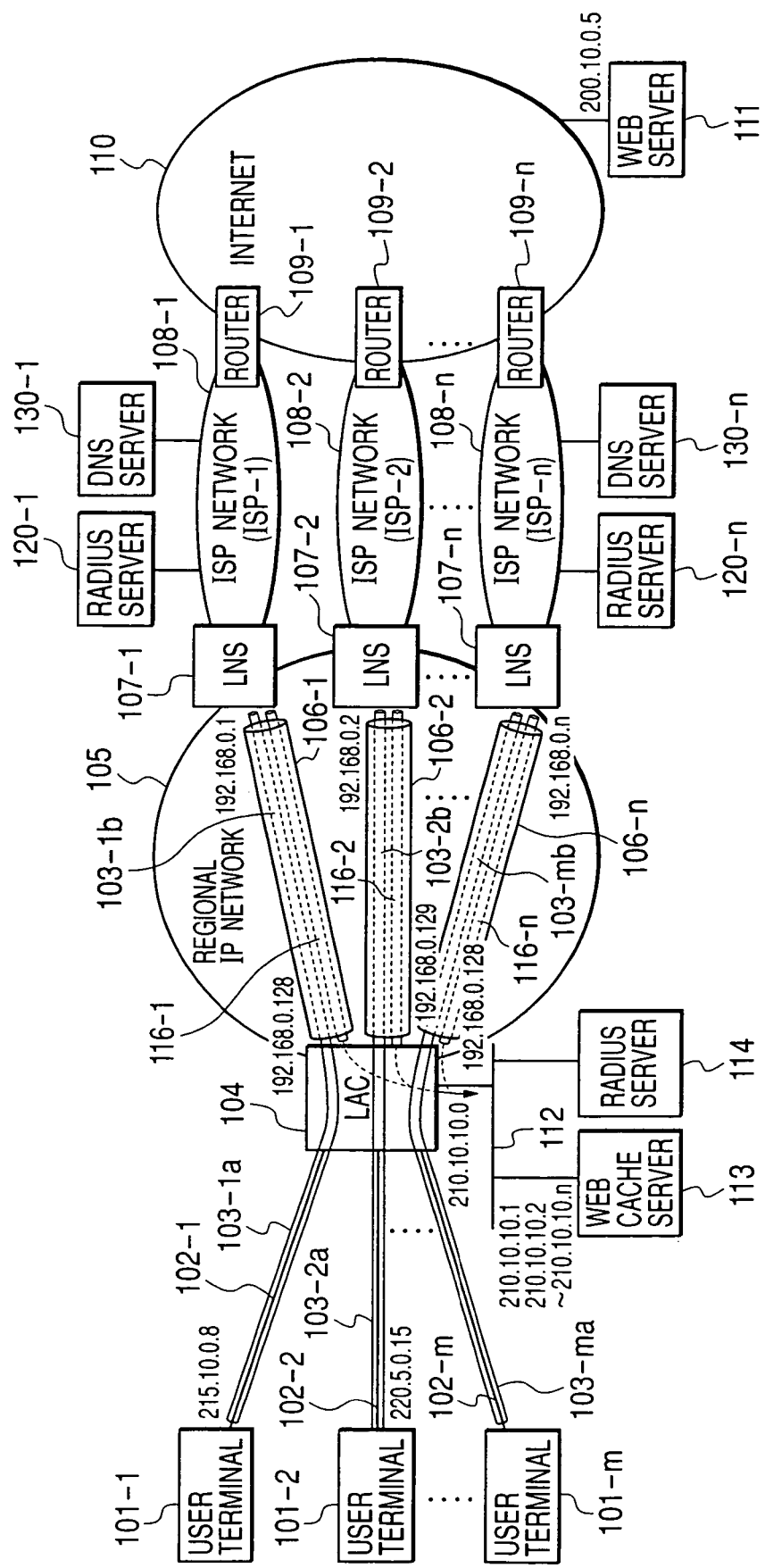
FIG. 4 is a diagram showing a state where PPP connections for communication between a cache server and a Web server are formed in the ISP selection type network system.

Referring now to FIGS. 2 to 4, transition of a connection in the case where the Internet 110 is accessed by the user terminal 101-1 having an agreement with the provider of the ISP network 108-1 in the ISP selection type IP network system will be described.

As shown in FIG. 2, the user terminal 101-1 establishes a PPP (Point to Point Protocol) connection 103-1a between the user terminal 101-1 and the LAC 104 via the access line 102-1. On the PPP connection, data is transferred in the form of a PPP frame 200.

The PPP frame 200 includes, as shown in FIG. 5A, at the front of an information field 205 in which an IP packet is set, a PPP header constructed by a flag field 201, an address field 202, a control field 203, and a protocol identification field 204 and includes, at the back of the information field 205, a PAD field 206, an FCS field 207, and a flag field 208.

The data type of the information field 205 is identified by the protocol identification field 204. FIG. 5B shows the relation between representative identification values 204B and protocols 204A to be set in the protocol identification field 204.

The IPCP (Internet Protocol Control Protocol) is applied to the transfer of IP packets. After performing IP negotiation on transmission and reception of an IP address and the like between two nodes at both ends of the PPP connection, IP packets are transmitted. To suppress overhead of data transfer using a PPP header, there are LCP configuration options such as compression of the address field 202 and control field 203 and compression of the protocol field 204 (for example, only lower one byte is transmitted if the protocol identification value is smaller than 00FFh). An option to be used on the PPP connection is determined by negotiation according to an LCP (Link Control Protocol) by the two nodes at both ends of the PPP connection.

When an LCP packet (Link Configure-Request) is received in a form of a PPP frame from the user terminal 101-1, the LAC 104 communicates LCP control data with a user terminal to establish a link. After that, the user terminal 101-1 transmits user name information and password to the LAC 104 in conformity with an authentication protocol such as PAP (Password Authentication Protocol) or CHAP (Challenge Handshake Authentication Protocol). The LAC 104 transfers the data to the RADIUS server 114 and requests the RADIUS server 114 to perform primary authentication of the user. When a response indicative of successful authentication is transmitted from the RADIUS server 114, the LAC 104 identifies the ISP to which the user terminal 101-1 belongs, for example, from the user name information and specifies the LNS 107-1 corresponding to the ISP.

By transmitting and receiving an L2TP control message 300 to and from the LNS 107-1, as shown in FIG. 3, the LAC 104 establishes an L2TP connection 106-1 between the LAC 104 and the LNS 107-1 and, after that, establishes a user session. By the operation, the tunnel ID of the L2TP connection 106-1 and the session ID are determined.

The LAC 104 transmits LCP information for setting the PPP options and authentication information (user name and password) to the LNS 107-2 through the L2TP connection 106-1. On the basis of the LCP information, negotiation of the PPP option is performed between the LAC 104 and LNS 107-2. The authentication information is transferred to the RADIUS server 120-1 where the user authentication is performed. By the procedure, a PPP connection 103-1*b* for the user terminal 101-1 is established on the L2TP connection 106-1.

For convenience of explanation, in FIG. 3, different reference numerals are designated to the PPP connection 103-1*a* between the user terminal 101-1 and the LAC 104 and the PPP connection 103-1*b* between the LAC 104 and the LNS 107-1. In reality, by managing the tunnel ID of the L2TP connection 106-1 and the session ID assigned when the user session is established in association with the PPP connection 103-1*a*, the PPP connections 103-1*b* and 103-1*a* are managed by the same connection identification in the LAC 104.

Dynamic assignment of an IP address to the user terminal 101-1 by an HDCP server is performed after the PPP connection 103-1*b* is established. It allows the user terminal 101-1 to access the Internet 110 via the PPP connection 103-1 (103-1*a* and 103-1*b*) and the ISP network 108-1.

FIG. 4 shows PPP connections in the case where the user terminals 101-1, 101-2, and 101-*m* subscribe different ISP networks.

This example shows a state where the PPP connection 103-2*a* between the user terminal 101-2 and the LAC 104 is extended to the LNS 107-2 through a PPP connection 103-2*b* on an L2TP connection 106-2, and a PPP connection 103-*ma* between the user terminal 101-*m* and the LAC 104 is extended to the LNS 107-*n* through a PPP connection 103-*nb* on an L2TP connection 106-*n*. Each of the PPP connection 103*s* (103-1*b* to 103-*nb*) for the user terminal is established in accordance with necessity of the user and canceled when it becomes unnecessary.

In the ISP selection type IP network of the invention, on the L2TP connections 106-1 to 106-*n* between the LAC 104 and the LNS 107-1 to 107-*n*, aside from the PPP connection 103 for the user terminal, PPP connections 116 (116-1 to 116-*n*) for the Web cache server 103 are set. The PPP connections 116 are set when the Web cache server 113 is started up and steadily exist.

The invention is characterized in that the LAC 104 captures an HTTP request message sent from the user terminal 101 (101-1 to 101-*m*) to the PPP connection 103 (103-1*a* to 103-*ma*) in order to obtain Web contents and transfers the HTTP request message to the cache server 113, and the cache server 113 returns an HTTP response message to the user terminal as the requester. Only when the Web contents requested by the user do not exist in the cache data, the cache server 113 obtains the Web contents from the Web server 111 by using one of the PPP connections 116 (116-1 to 116-*n*) and transfers the Web contents to the requester.

With the configuration, direct communication between the user terminal and the Web server 111 is suppressed, so that the traffic volume of the HTTP request message and HTTP response message on the regional IP network 105 as an access network to the Internet 110 can be largely reduced.

A packet transfer sequence used in the case where a Web browser application operating on the user terminal 101-1 obtains Web contents in the above network will be described in more detail.

Figures 6A, 6B:
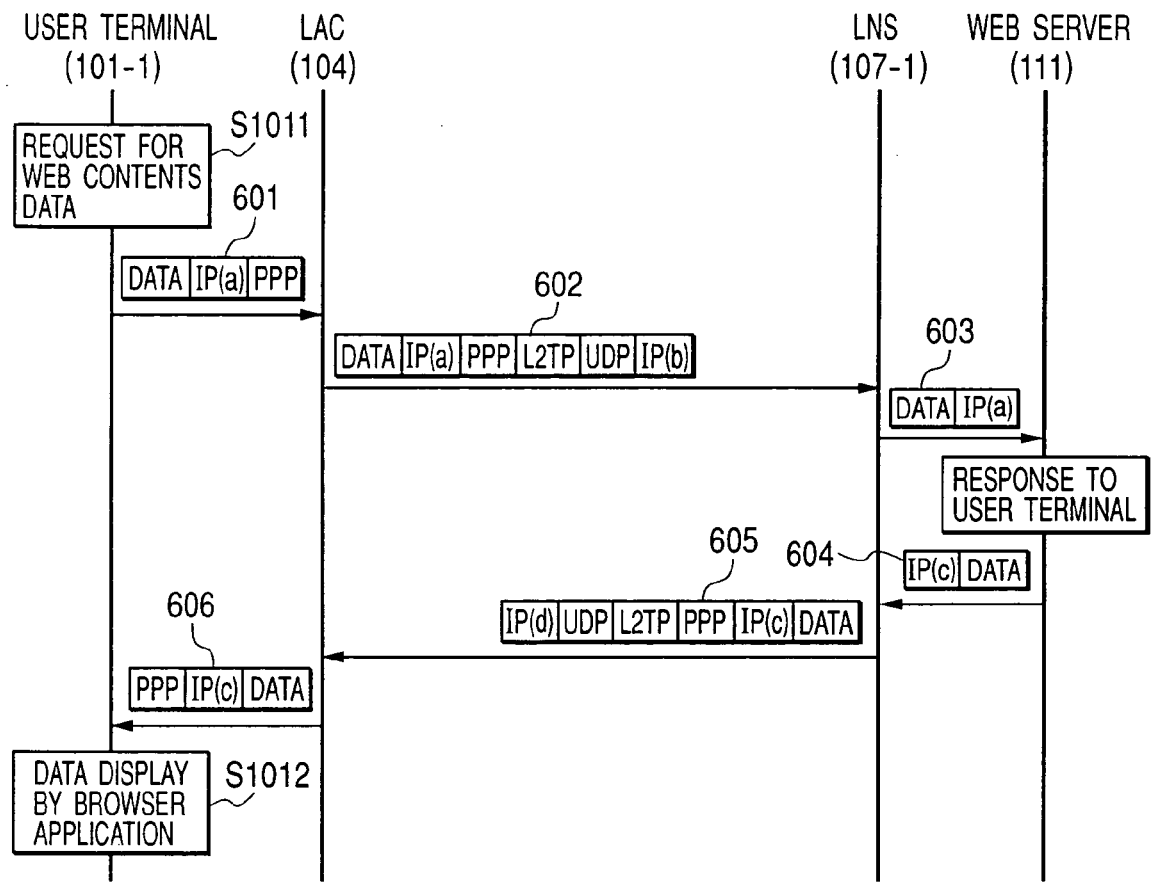
FIG. 6A shows a packet transfer sequence used in the case where a user terminal obtains Web contents data in an ISP selection type network system to which a conventional LAC is applied.
FIG. 6B is a diagram showing the relation between the destination address DA and the source address SA of an IP header attached to each of transfer packets of FIG. 6A.

First, to make the invention understood more easily, a packet transfer sequence in the case where the LAC 104 shown in FIG. 1 takes the form of a conventional gateway apparatus will be described with reference to FIGS. 6A and 6B. FIG. 6B shows the relation between the destination address DA and the source address SA of an IP header attached to each of transfer packets illustrated in FIG. 6A.

When the user of the terminal 101-1 designates contents data to be obtained from the Web server 111 by using an URL (Uniform Resource Identifier) in the Web browser application (S1011), an HTTP request message for the Web server 111 including the URL is transmitted from the user terminal 101-1 to the access line 102-1. The HTTP request message is transmitted to the access line 102-1, in the form of a PPP frame 601 obtained by adding a PPP header to an IP packet having an IP header IP (a) in which the IP address of the Web server 111 is set as a destination address and the IP address of the terminal 101-1 is set as a source address.

The LAC 104 converts the PPP frame 601 received from the access line 102-1 into an IP packet 602 having an L2TP header, an UDP header, and a new IP header IP(b) and transfers the IP packet 602 to the L2TP connection 106-1 extended to the LNS 107-1. The IP address of the LNS 107-1 is set as the destination address of the IP header IP (b), and the IP address of the LAC 104 is set as the source address of the IP header IP (b).

The IP packet 602 is routed in the regional IP network 105 and arrives at the LNS 107-1. The LNS 107-1 performs a process of terminating the L2TP, such as elimination of the IP header, UDP header, and L2TP header, and a process of terminating the PPP, such as elimination of the PPP header, on the IP packet 602, thereby converting the IP packet 602 back to the format of the IP packet 603 having the IP header IP(a), and transmits the IP packet 603 to the ISP network 108-1. The IP packet 603 is relayed from the ISP network 108-1 to the Internet 110 via the router 109-1 and transferred to the Web server 111.

The Web server 111 extracts the HTTP request message from the data portion of the received IP packet 603 and retrieves the contents data designated by the URL in the HTTP request message. An HTTP response message including a retrieval result is transmitted to the Internet 110 as an IP packet 604 having an IP header IP(c), in which the IP address of the requester user terminal 101-1 is set as a destination address and the IP address of the Web server 111 is set as a source address, and arrives at the LNS 107-1 via the router 109-1 and the ISP network 108-1.

The LNS 107-1 specifies the PPP connection from the destination address of the received packet 604, converts the received packet 604 into an IP packet 605 having the PPP header, L2TP header, UDP header, and a new IP header IP (d), and transmits the IP packet 605 to the L2TP connection 106-1. The destination address of the IP header IP(d) is the IP address of the LAC 104 and the source address is the IP address of the LNS 107-1.

The LAC 104 performs an L2TP terminating process on the IP packet 605 received from the regional IP network 105, converts the received packet 605 into a PPP packet 606, and transfers the PPP packet 606 to the access line 102-1. The PPP packet 606 is received by the user terminal 101-1 and the contents data extracted from the HTTP response message is displayed on a terminal screen by the Web browser application (S1012).

As the above sequence shows, in the conventional ISP selection type IP network, in the case of obtaining the contents data provided by the Web server 111, the HTTP request message transmitted from the user terminal 101-1 is transferred via the access network 105 (PPP connection 103-1) and the ISP network 108-1 to the Web server 111. The response message from the Web server 111 is transmitted to the user terminal as the requester via the ISP network 108-1 and the access network 105. That is, the conventional LAC 104 simply relays the HTTP request message (PPP frame) received from the user terminal to the L2TP connection on the access network 105 side and does not have the function of routing the IP packet in accordance with the IP header in the PPP frame.

A packet transfer sequence in the case where the gateway apparatus of the invention is applied as the LAC 104 will now be described with reference to FIGS. 7 and 8.

In this example, it is assumed that the IP address of the Web cache server 113 corresponding to the ISP of each terminal user is preset as a proxy server address in the Web browser application operating on each of the user terminals 101-$i$ (i= 1 to m) accommodated by the LAC 104. Therefore, the HTTP request message is transmitted as a PPP packet including the IP address of the Web cache server 113 in the destination address field of the IP header, from the user terminal to the LAC 104.

In the example, the LAC 104 checks the destination IP address of a packet received from the access line 102-$i$ (i=1 to m) and routes the received packet in accordance with the destination IP address. The IP packet including the HTTP request message is transferred from the LAC 104 to the Web cache server 113. In the case where contents data designated by the URL exists in the Web cache server 113, a response message including the designated contents data is returned from the Web cache server 113 to the requester user terminal.

Figure 7A:
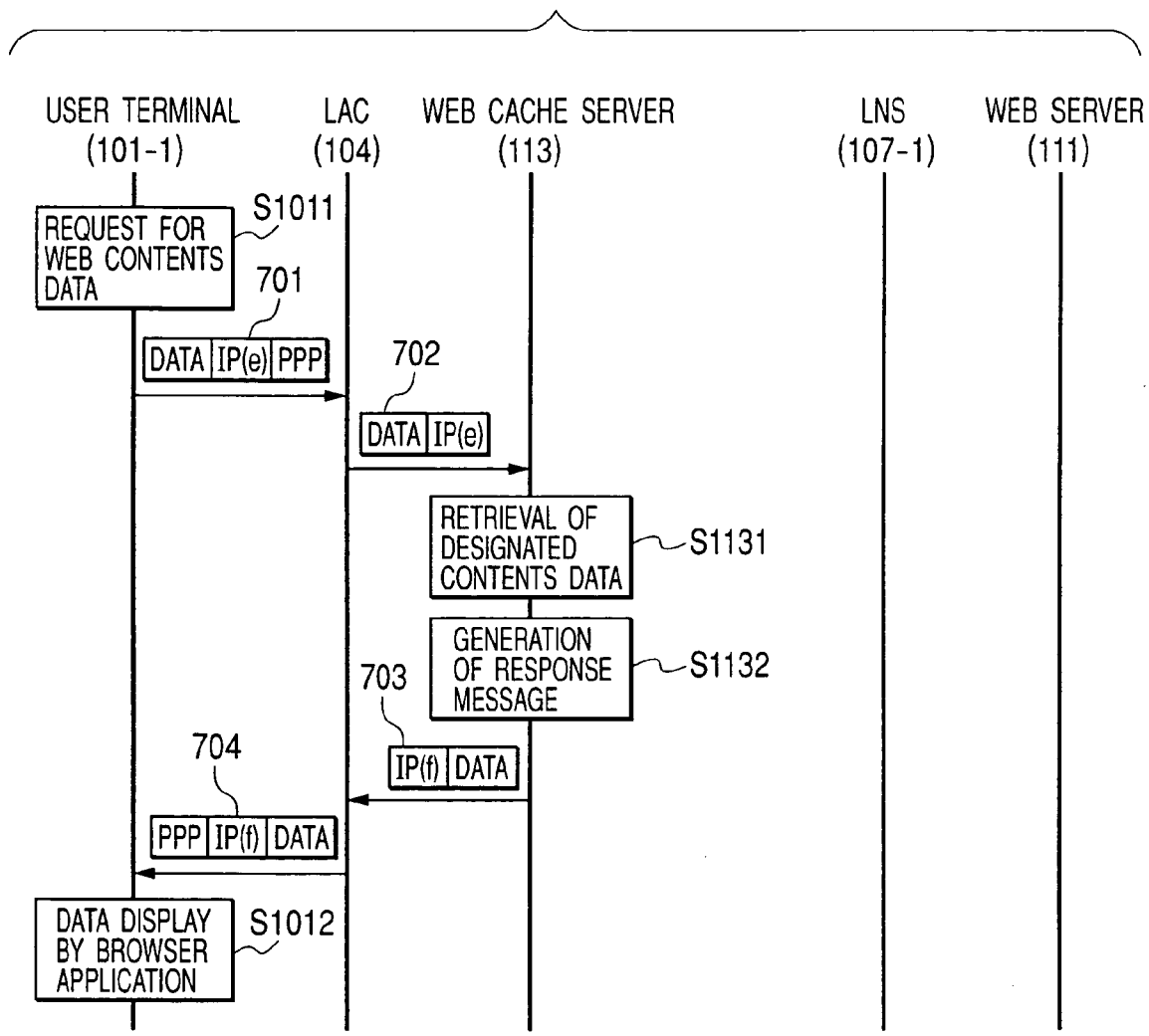
FIG. 7A shows a packet transfer sequence used in the case where Web contents data requested by the user terminal exists in a cache server in an ISP selection type network system to which a gateway apparatus of a first embodiment of the invention is applied as an LAC.
Figure 7B:
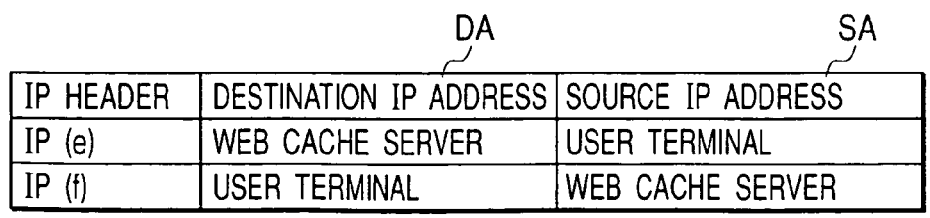
FIG. 7B is a diagram showing the relation between the destination address DA and the source address SA of an IP header attached to each of transfer packets of FIG. 7A.

FIG. 7A shows a packet transfer sequence used in the case where the contents data designated by the URL exits in the Web cache server 113. FIG. 7B shows the relation between the destination address DA and the source address SA of an IP header attached to each of transfer packets illustrated in FIG. 7A.

When the user designates the URL of contents data to the Web browser application operating on the user terminal 101-1, a PPP frame 701 including the HTTP request message is generated and transmitted from the user terminal 101-1 to the access line 102-1 (S1011). As the destination address of an IP header IP(e) of the PPP frame 701, the IP address of a Web cache server corresponding to a specific ISP subscribed by the terminal user is automatically set by the proxy setting of the Web browser application. The destination address is, for example, any of the plurality of IP addresses "210.10.10.1" to "210.10.10.n" assigned to the Web cache server 113 in FIG. 1.

When the PPP frame 701 is received, the LAC 104 extracts an IP packet 702 from the received PPP frame and compares the destination address of the IP header IP(e) with the IP addresses assigned to the Web cache server 113 preregistered in the LAC. When the destination address coincides with one of the IP addresses assigned to the Web cache server 113, the LAC 104 transfers the IP packet 702 to the Web cache server 113. When the destination address does not coincide with none of the IP addresses assigned to the Web cache server 113, the LAC 104 relays the received PPP frame 701 to the PPP connection 103-1$b$ on the regional IP network 105 side.

When the IP packet 702 is received from the LAC 104, the Web cache server 113 extracts the HTTP request message from the data portion and retrieves the contents data designated by the URL from the cache data (S1131). When the designated contents data is found, the Web cache server 113 generates an HTTP response message including the contents data (S1132) and transmits an IP packet 703 including the HTTP response message in its data portion and having the IP address of the requester user terminal 101-1 as the destination address to the LAC 104.

Since the destination address of the packet 703 received from the Web cache server 113 indicates the user terminal 101-1, the LAC 104 converts the received packet 703 into the format of a PPP frame 704 and transfers the PPP frame 704 to the access line 102-1.

FIG. 8A shows a packet transfer sequence used in the case where the contents data designated by the HTTP request message does not exist in the Web cache server 113. FIG. 8B shows the relation between the destination address DA and the source address SA of the IP header attached to each of the transfer packets shown in FIG. 8A.

In a manner similar to the case of FIG. 7A, when the PPP frame 701 including the HTTP request message is received from the access line 102-1, the LAC 104 determines the destination address of the IP header IP (e) and transfers the IP packet 702 to the Web cache server 113.

The Web cache server 113 extracts the HTTP request message from the data field in the received packet 702 and retrieves the contents data designated by the URL from the cache data (S1131). As a result of retrieval, when the designated contents data does not exist in the cache data, the Web cache server 113 sends an inquiry about the IP address of the Web server 111 having the host name of the URL to the DNS server 130-1 (S1133). When the IP address of the Web server 111 is found, the Web cache server 113 generates an IP packet 705 in which the HTTP request message is set in the data field and transmits it to the LAC 104. The destination address of a header IP (g) of the IP packet 705 is the IP address of the Web server 111 and the source address is the IP address assigned to the Web cache server 113, which is the destination address of the PPP frame 701.

When the IP packet 705 is received from the Web cache server, the LAC 104 specifies the destination LNS from the source address of the received packet. In the example, the destination LNS is 107-1. The LAC 104 converts the IP packet 705 into an IP packet 706 and transfers the IP packet 706 to the PPP connection 116-1 on the L2TP connection 106-1 between the LNS 107-1 and the LAC 104. The IP packet 706 is obtained by adding the PPP header, L2TP header, UDP header, and IP header IP(h) to the received IP packet 705. The destination address of the IP header IP (h) is the IP address of the LNS 107-1 and the source address is the IP address of the LAC 104.

The IP packet 706 is subjected to a L2TP and PPP terminating process in the LNS 107-1, thereby converting the IP packet 706 into the original IP packet 705 transmitted from the Web cache server 113, and the IP packet 705 is transferred to the Web server The Web server 111 extracts the HTTP request message from the data field of the received packet 705, retrieves the contents data designated by the URL (S1111), and transmits an HTTP response message including the designated contents data as an IP packet 708 to the Internet 110. In the IP header IP(i) of the IP packet 708, the IP address of the Web cache server 113 is set as a destination address and the IP address of the Web server 111 is set as a source address.

The IP packet 708 is received by the LNS 107-1 and converted into an IP packet 709 by adding the PPP header, L2TP header, UDP header, and an IP header IP(j), and the IP packet 709 is transmitted to the L2TP connection 106-1 in the regional IP network. The destination address of the IP header IP(j) is the IP address of the LAC 104 and the source address is the IP address of the LNS 107-1. The IP packet 709 is subjected to a process of terminating the L2TP and PPP in the LAC 104, thereby obtaining the original IP packet 708. According to the destination address of the IP header IP(i), the IP packet 708 is transferred to the Web cache server 113.

The Web cache server 113 extracts the HTTP response message from the data field of the received packet 708, stores the Web contents data included in the response message as cache data, generates an HTTP response message for the user terminal 101-1 as the requester of the contents data (S1134), and transmits the HTTP response message as the IP packet 703 to the LAC 104. Since the destination address of the IP packet 703 received from the Web cache server 113 is the IP address of the user terminal 101-1, the LAC 104 converts the received packet into the PPP frame 704 and transmits the PPP frame 704 to the access line 102-1 of the user terminal 101-1.

Figure 9:
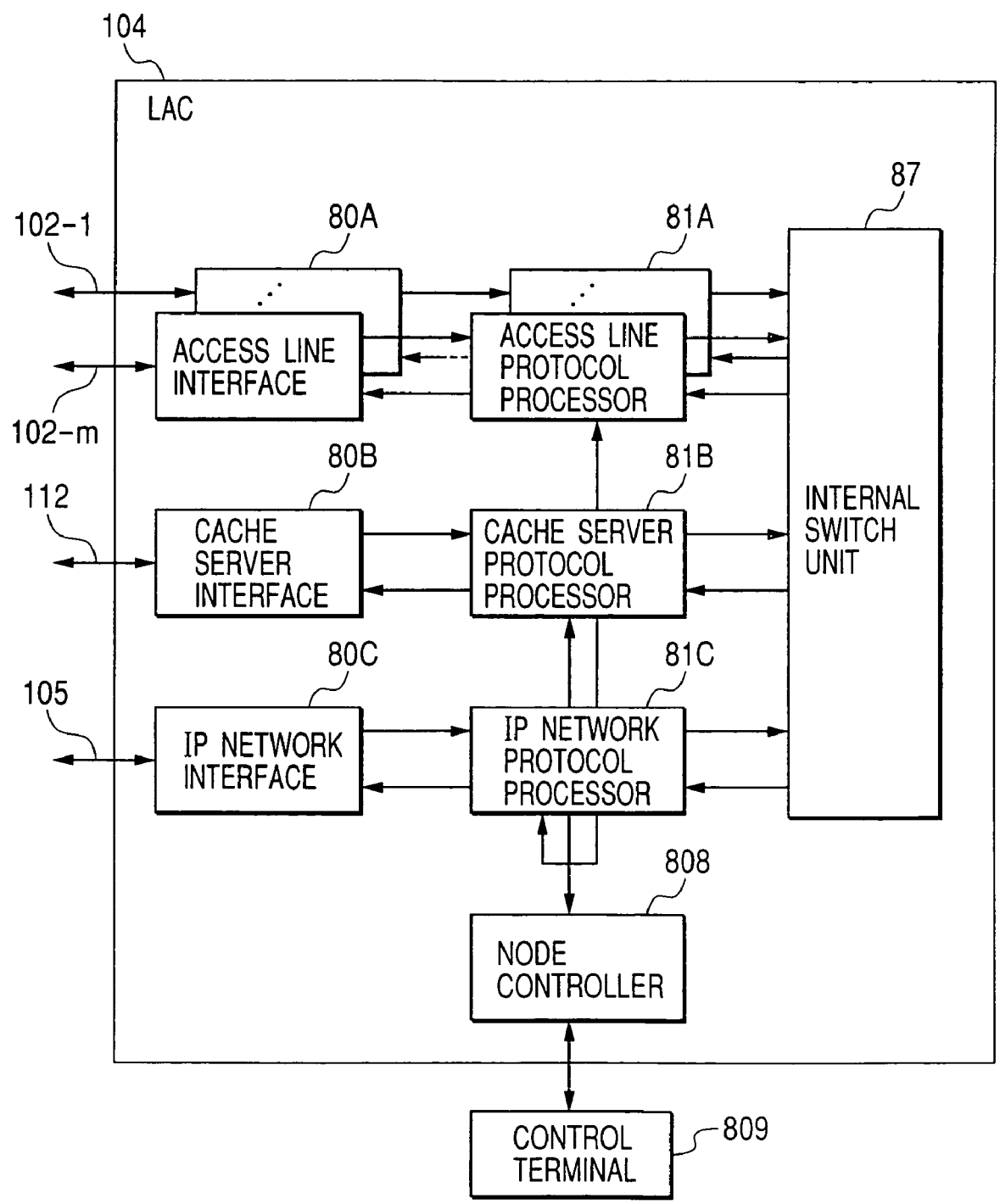
FIG. 9 is a block diagram showing the configuration of a gateway apparatus of the invention applied as an LAC.

FIG. 9 is a block diagram showing an example of the gateway apparatus according to the invention having the function of the LAC 104.

The gateway apparatus (LAC) 104 has: a plurality of access line interfaces 80A each accommodating the access lines 101-i (i=1 to m); a Web cache server interface 80B connected to the LAN 112; an IP network interface 80C connected to the regional IP network 105; protocol processors 81A, 81B, and 81C provided in correspondence with the interfaces 80A, 80B, and 80C, respectively; an internal switch unit 87 for making packets exchanged among the protocol processors; and a node controller 808 connected to the protocol processors.

Each of the interfaces 80A to 80C transmits and receives packet data in accordance with the type of the physical layer circuit (for example, Ethernet or ATM) of the network accommodated by the interface. The protocol processors 81A to 81C have the protocol processing functions corresponding to the interfaces 80A to 80C, respectively. Although one protocol processor 81A is connected to each of the access line interfaces 80A in FIG. 9, it is also possible to connect a plurality of access line interfaces 80A to each protocol processor 81A via a packet multiplexer/demultiplexer.

The internal switch unit 87 switches input packets received from the protocol processors 81A to 81C to one of the protocol processors specified by routing information of the internal header. The node controller 808 controls the whole operation of the gateway apparatus in accordance with setting information input from a control terminal 809 and outputs alarm and statistical information to the control terminal 809.

Figure 10:
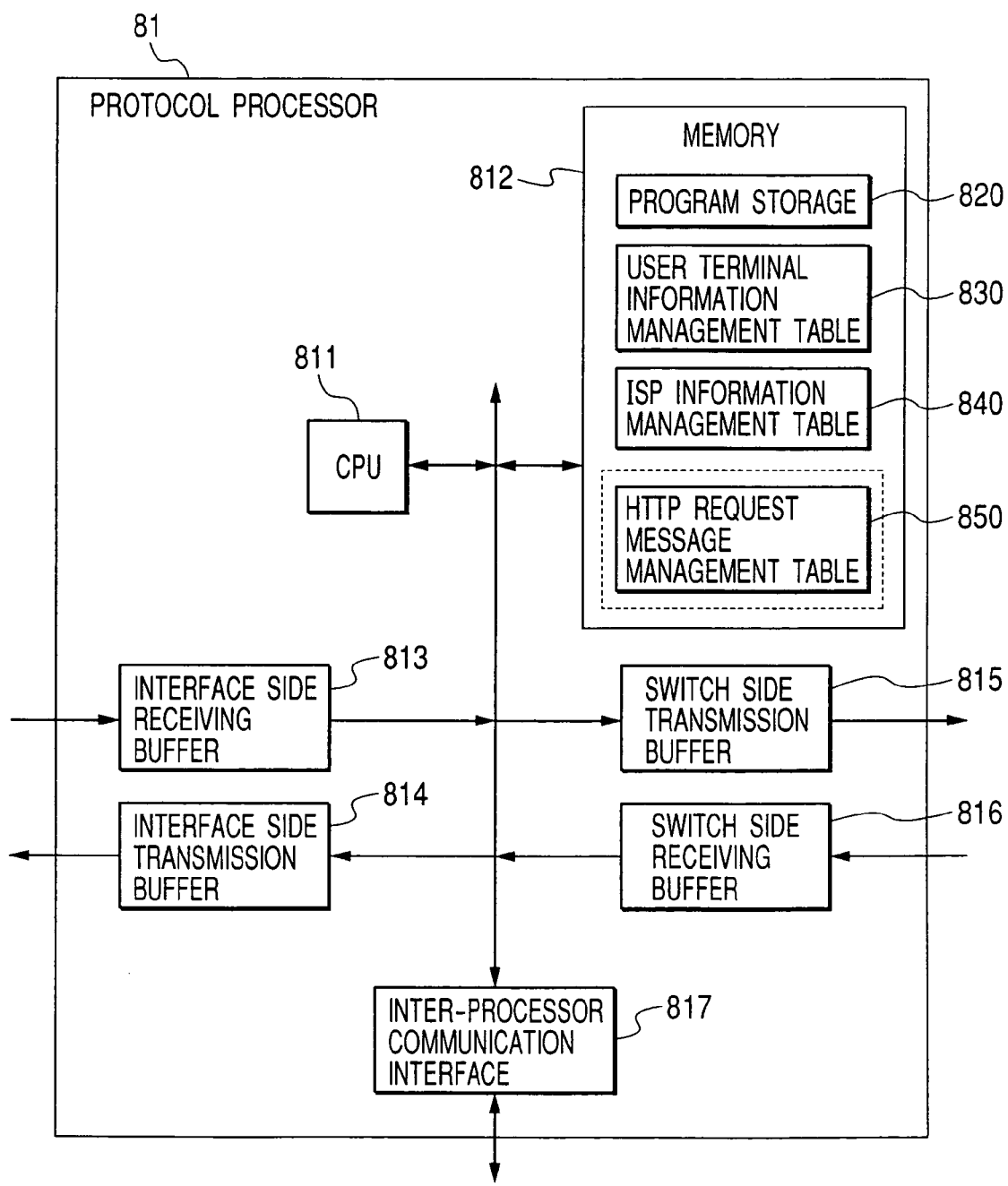
FIG. 10 is a block diagram showing the configuration of a protocol processor 81 (81A to 81C) illustrated in FIG. 9.

FIG. 10 shows a basic configuration of the protocol processor 81 (81A to 81C).

The protocol processor 81 includes a CPU 811, a memory 812, an interface side receiving buffer 813, an interface side transmission buffer 814, a switch side transmission buffer 815, a switch side receiving buffer 816, and an inter-processor communication interface 817. The protocol processor 81 has the same hardware configuration irrespective of the type of an interface connected.

The memory 812 includes a program storage 820, a user terminal information management table 830, an ISP information management table 840, and an HTTP request message management table 850. The HTTP request message management table 850 is a table necessary in a second embodiment of the invention to be described later and is not necessary in the first embodiment of the invention described below. In the program storage 820, programs according to the functions of the protocol processors (81A, 81B, and 81C) are stored as will be described later. By executing a prepared program by the CPU 811, a predetermined protocol process is performed on data transmitted and received to and from a corresponding interface.

The CPU 811 communicates management information necessary for the protocol process, alarm, and statistical information with the other protocol processors and the node controller 808 as components of the gateway apparatus 104 via the inter-processor communication interface 817.

Packet data (IP packet or PPP frame) received by the interface 80 (80A to 80C) is transferred to the corresponding protocol processor 81 (81A to 81C) and temporarily stored in the interface side receiving buffer 813 shown in FIG. 10. The packet data accumulated in the interface side receiving buffer 813 is subjected to a predetermined protocol process defined by a received packet processing routine prepared in the program storage 820 by the CPU 811 and input to the internal switch unit 87 via the switch side transmission buffer 815.

The packet data received from the internal switch unit 87 is temporarily accumulated in the switch side receiving buffer 816, subjected to a predetermined protocol process defined by the transmission packet processing routine prepared in the program storage 820, and transmitted to the corresponding interface 80 (80A to 80C) via the interface side transmission buffer 814.

FIGS. 1A to 11E show packet formats transferred between the interface 80 and the protocol processor 81.

Figure 11A:
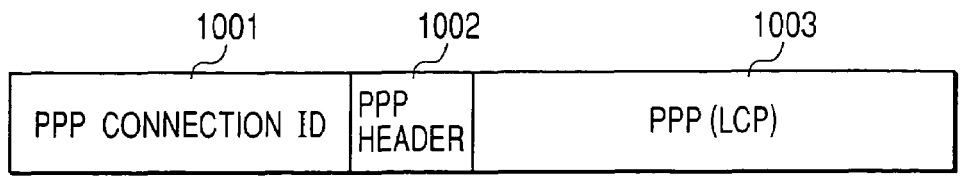
FIGS. 11A to 11E are diagrams showing the formats of packet data transferred between interfaces 80 (80A to 80C) and the protocol processors 81 (81A to 81C) respectively, in the gateway apparatus of the invention.
Figure 11B:
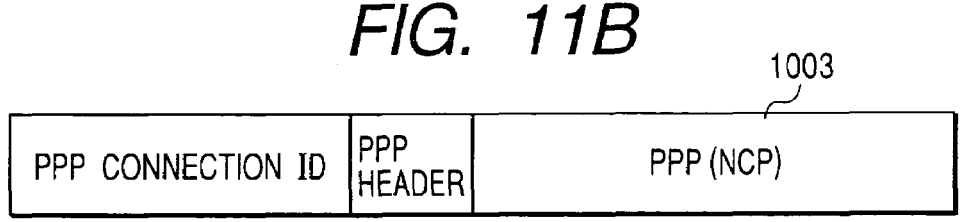
Figure 11C:
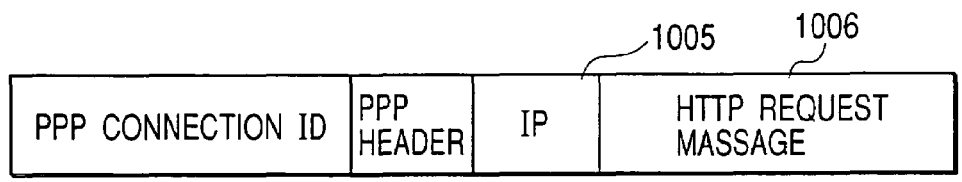
Figure 11D:
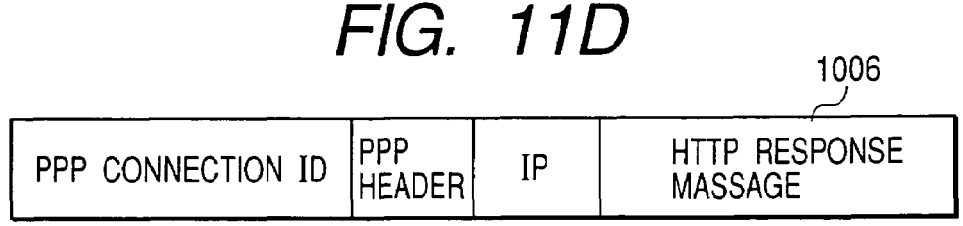
Figure 11E:
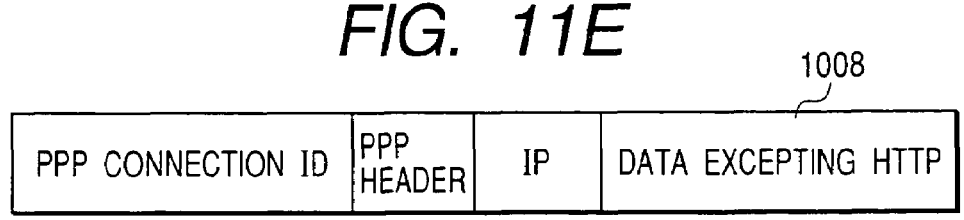

FIG. 11A shows a PPP frame in which LCP control information is included in a payload field 1003, FIG. 11B shows a PPP frame in which NCP control information is included in the payload field 1003, FIG. 11C shows a PPP frame in which an IP header 1005 and an HTTP request message 1006 are included in the payload field 1003, FIG. 11D shows a PPP frame in which the IP header 1005 and an HTTP response message 1007 are included in the payload field 1003, and FIG. 11E shows a PPP frame in which the IP header 1005 and a data excepting HTTP 1008 such as electronic mail and Telnet are included in the payload field 100.3.

In the PPP frame, a PPP connection ID 1001 is added in front of a PPP header 1002 by the interface 80 (80A to 80C). When received data is not associated with a specific PPP connection, a predetermined magic number indicative of an unspecified PPP connection is added as the ID 1001.

The conventional LAC identifies the protocol information included in the PPP header 1002 and executes the LCP or NCP process in the LAC on a frame in which control information of LCP or NCP is included in the payload field 1003 as shown in FIGS. 11A and 11B. With respect to a PPP frame in which an IP packet is included in the payload field 1003 as shown in FIGS. 11C to 11E, however, the conventional LAC has only the function of simply dealing the PPP frame as user traffic data, and relaying the received frame to an output network side along a pre-designated PPP connection.

In contrast, in the LAC of the invention, when a PPP frame received from the access line or IP network includes an IP packet (user traffic data) in its payload field 1003, the access line protocol processor 81A and the IP network protocol processor 81C check the destination address of the IP header 1005, if the IP packet is for the HTTP traffic, extract the received IP packet from the PPP connection, and transfer the IP packet to the cache server 114 connected to the LAC.

Figure 12:
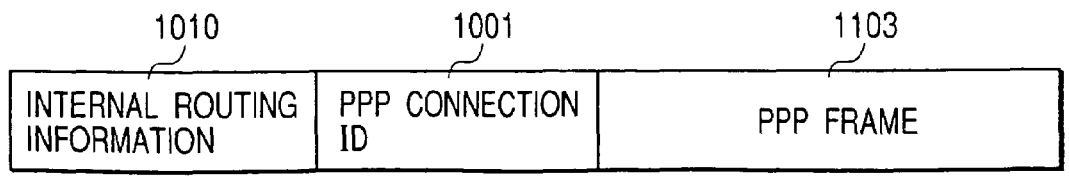
FIG. 12 is a diagram showing the format of packet data transferred between the protocol processor 81 (81A to 81C) and an internal switch unit 87 in the gateway apparatus of the invention.

FIG. 12 shows an internal packet format communicated between the protocol processor 81 (81A to 81C) and the internal switch unit 87.

The protocol processor 81 adds an internal header 1010 including internal routing information to the packet (a PPP frame 1103 to which the PPP connection ID 1001 is added)

received from the interface 80 (80A to 80C) and outputs the resultant to the internal switch unit 87. The PPP connection ID 1001 added to the received packet is rewritten by the protocol processor 81 as necessary. The internal switch unit 87 switches the received packet from a protocol processor 81 to another protocol processor 81 designated by the internal routing information (internal header) 1010.

FIG. 13 shows an example of the user terminal information management table 830.

In the user terminal information management table 830, a plurality of management information entries corresponding to user terminals accommodated by the LAC 104 are registered. Each of the management information entries shows the corresponding relations of a user terminal IP address 831, an ID 832 of PPP connection between the user terminal and the LNS, an ID 833 of the ISP to which the user belongs, an LCP (Link Control Protocol) configuration option information 834 of the PPP connection, and L2TP connection information 835.

The LCP configuration option information 834 includes, for example, a set value 834a indicative of the presence or absence of selection of a protocol field compression (PFC) option and a set value 834b indicative of the presence or absence of selection of an address and control field compression (ACFC) option. The L2TP connection information 835 includes a tunnel ID 835a and a session ID 835b to be used at the time of establishing a PPP connection in the L2TP connection.

FIG. 14 shows an example of the ISP information management table 840.

In the ISP information management table 840, a plurality of management information entries corresponding to the ISP networks connected to the access network 105 are stored.

Each of the management information entries shows the corresponding relations of an ISP ID 841, an IP address 842 assigned to the Web cache server 113, an IP address 843 of the LNS accommodating the ISP network indicated by the ISP ID 841, an ID 844 of the PPP connection between the LAC and LNS used for communication between the Web cache server 113 and the Web server 111, LCP configuration option information 845, and L2TP connection information 846. Each of the LCP configuration option information 845 and L2TP connection information 846 includes information items as those in the user information management table 830.

Figure 15:
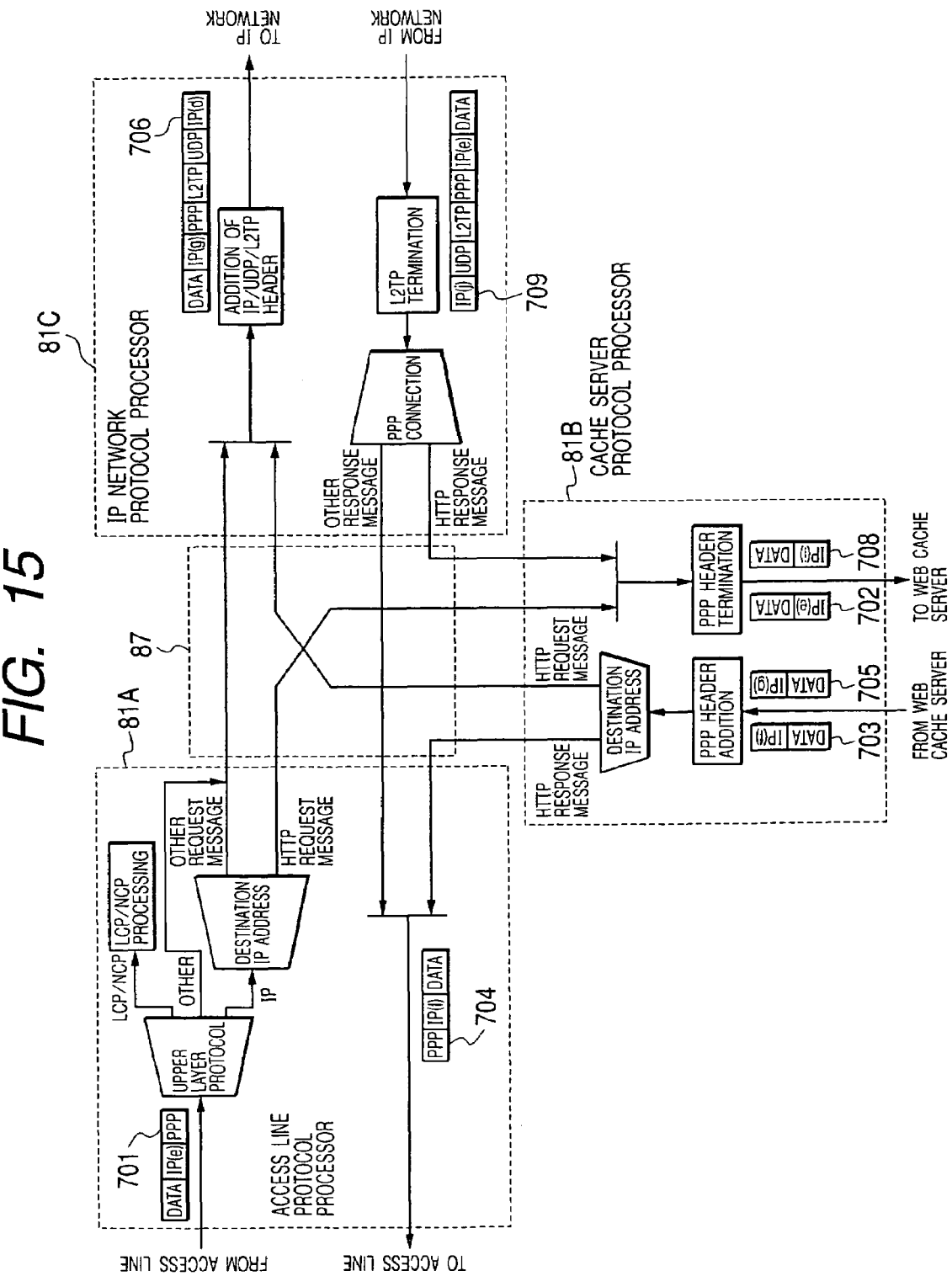
FIG. 15 is a diagram for explaining the flow of data in the gateway apparatus (LAC) of the first embodiment of the invention.

FIG. 15 shows the flow of data in the LAC 104 of the invention.

A PPP frame input from the access line to the access line interface 80A is processed in the protocol processor 81A corresponding to the access line in accordance with the type of the upper layer protocol indicated in the protocol identification field 204. When the upper layer protocol of the received frame is the LCP of the PPP, an LCP process is executed. When it is the NCP, an NCP process is performed.

When the upper layer protocol is the IP, a destination IP address is determined. For example, in the case where the destination address coincides with the IP address 842 assigned to the Web cache server registered in the ISP information management table 840 like the received frame 702 described by referring to FIG. 8, the IP packet 702 extracted from the received frame is transferred to the protocol processor 81B corresponding to the cache server via the internal switch unit 87.

When the upper layer protocol of the PPP is not the LCP, NCP, IP, nor the IP which is not for the Web cache server, the received packet is transferred to the IP network protocol processor 81C, and transmitted to a proper L2TP connection determined by the source IP address.

The IP packet received from the Web cache server 118 by the cache server protocol processor 81B is sent either the access line protocol processor 81A or IP network protocol processor 81C in accordance with the destination IP address.

For example, like the IP packet 703 described by referring to FIG. 8, the received packet coincided with the IP address 831 of any of the user terminals, whose IP address is registered in the user information management table 830 is determined as an IP packet including the HTTP response message and transferred to the access line protocol processor 81A. Like the IP packet 705 described by referring to FIG. 8, the received packet whose destination IP address does not match any of the user terminal IP addresses registered in the user information management table 830 is determined as an IP packet including the HTTP request message and transferred to the IP network protocol processor 81C.

The L2TP frame received from the IP network by the interface 80C is terminated by the IP network protocol processor 81C. A received IP packet extracted from the L2TP frame is properly sent to the access line protocol processor 81A or the cache server protocol processor 81B in accordance with the ID of the PPP connection. For example, the IP packet transferred via the PPP connection between the user terminal and LNS is transmitted to the access line protocol processor 81A, and the IP packet transferred via the PPP connection between the LAC and LNS for the cache server is transferred to the cache server protocol processor 81B.

Figure 16:
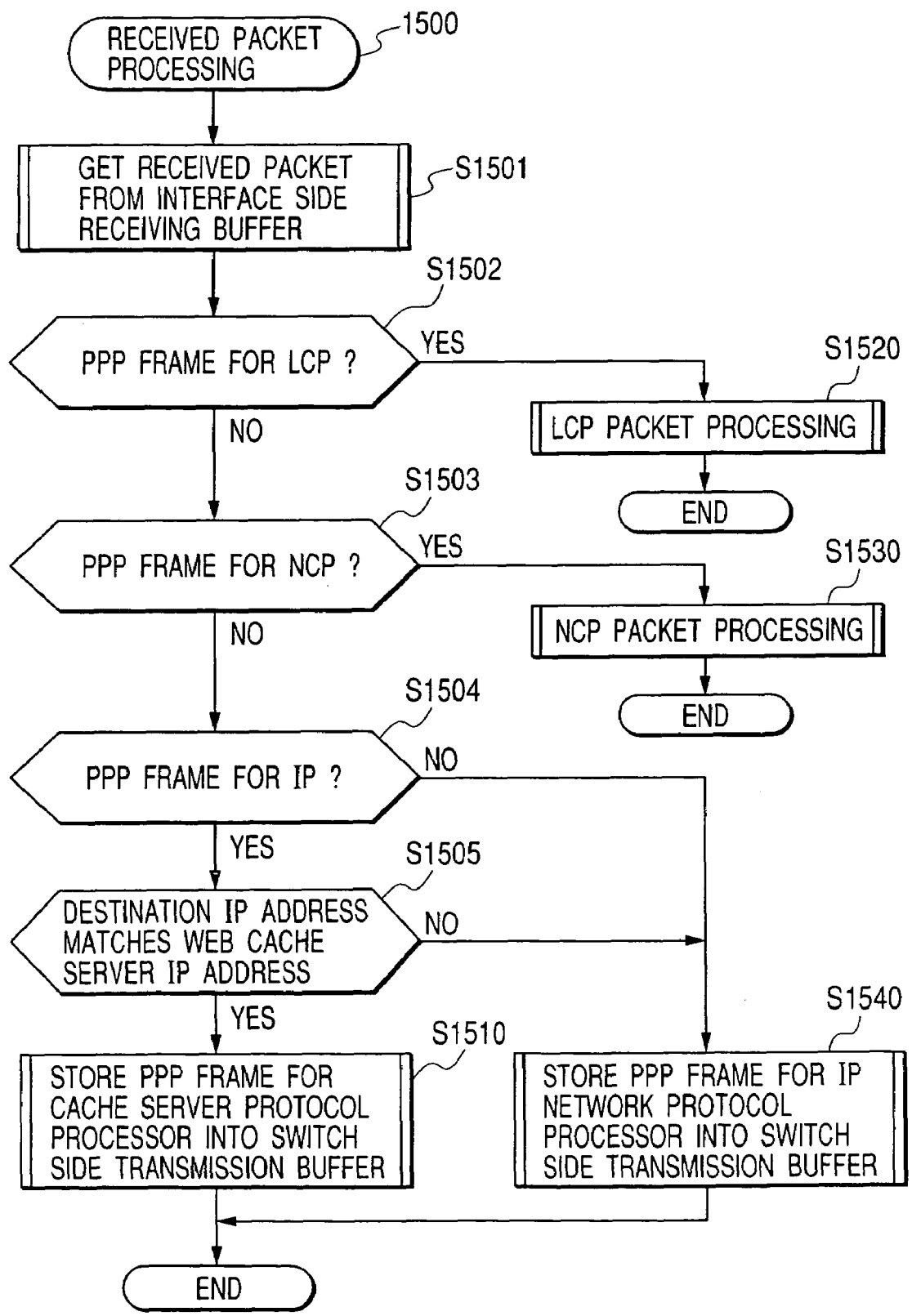
FIG. 16 is a flowchart showing an example of a received packet processing routine 1500 executed by the access line protocol processor 81A.

FIG. 16 shows the flowchart of a received packet processing routine 1500 executed by the CPU 811 in the access line protocol processor 81A.

In the received packet processing routine 1500, first, the received, packet shown in any of FIGS. 11A to 11E is taken out from the interface side receiving buffer 813 and the format of the PPP header 1002 is specified (S1501). The format of the PPP header can be specified by referring to the user terminal management table 830 on the basis of the PPP connection ID 1001 added to the received packet and reading out the LCP configuration option information 834 corresponding to the PPP connection ID.

Next, the upper layer protocol of the received PPP frame 1003 is identified from the contents of the protocol identification field 204 in the PPP header. When the upper layer protocol of the received PPP frame is the data link control protocol (LCP) (S1502), the LCP packet process is executed (S1520). When the upper layer protocol of the received PPP frame is the network control protocol (NCP) (S1503), the NCP packet process is executed (S1530).

When the upper layer protocol of the received PPP frame is the IP (S1504), whether the destination address of the IP header coincides with one of the IP addresses assigned to the Web cache server 113 or not is checked (SI505). Concretely, first, by referring to the user terminal management table 830 on the basis of the source address of the IP header, the ID 833 of the ISP to which the source user belongs is obtained. Next, by referring to the ISP information management table 840 on the basis of the ISP ID, the IP address 842 assigned to the Web cache server corresponding to the ISP is specified and compared with the destination address of the received IP packet.

When the destination address of the IP header coincides with the IP address assigned to the Web cache server, the PPP connection ID 1001 and the internal routing information 1010 are added to the received IP packet and the resultant is stored in the switch side transmission buffer 815 (S1510). In this case, as the PPP connection ID 1001, the ID 844 of the PPP connection between the LAC and LNS registered in the ISP information management table 840 in correspondence with the ISP ID is applied. As the internal routing information 1010, a value designating the cache server protocol processor 81B is set.

When the upper layer protocol of the received PPP frame 1003 is not the IP or when the upper layer protocol is the IP but the destination address does not coincide with the IP address assigned to the Web cache server, the internal routing information 1010 designating the IP network protocol processor 81C is added to the received packet, and the resultant is stored in the switch side transmission buffer 813 (S1540)

By repeating the execution of the received packet processing routine 1500, the PPP frame including the HTTP request message among the PPP frames transmitted from the user terminals 101-1 to 101-m can be transferred to the Web cache server 113 and the other PPP frames can be transferred to the IP network 105.

Figure 17:
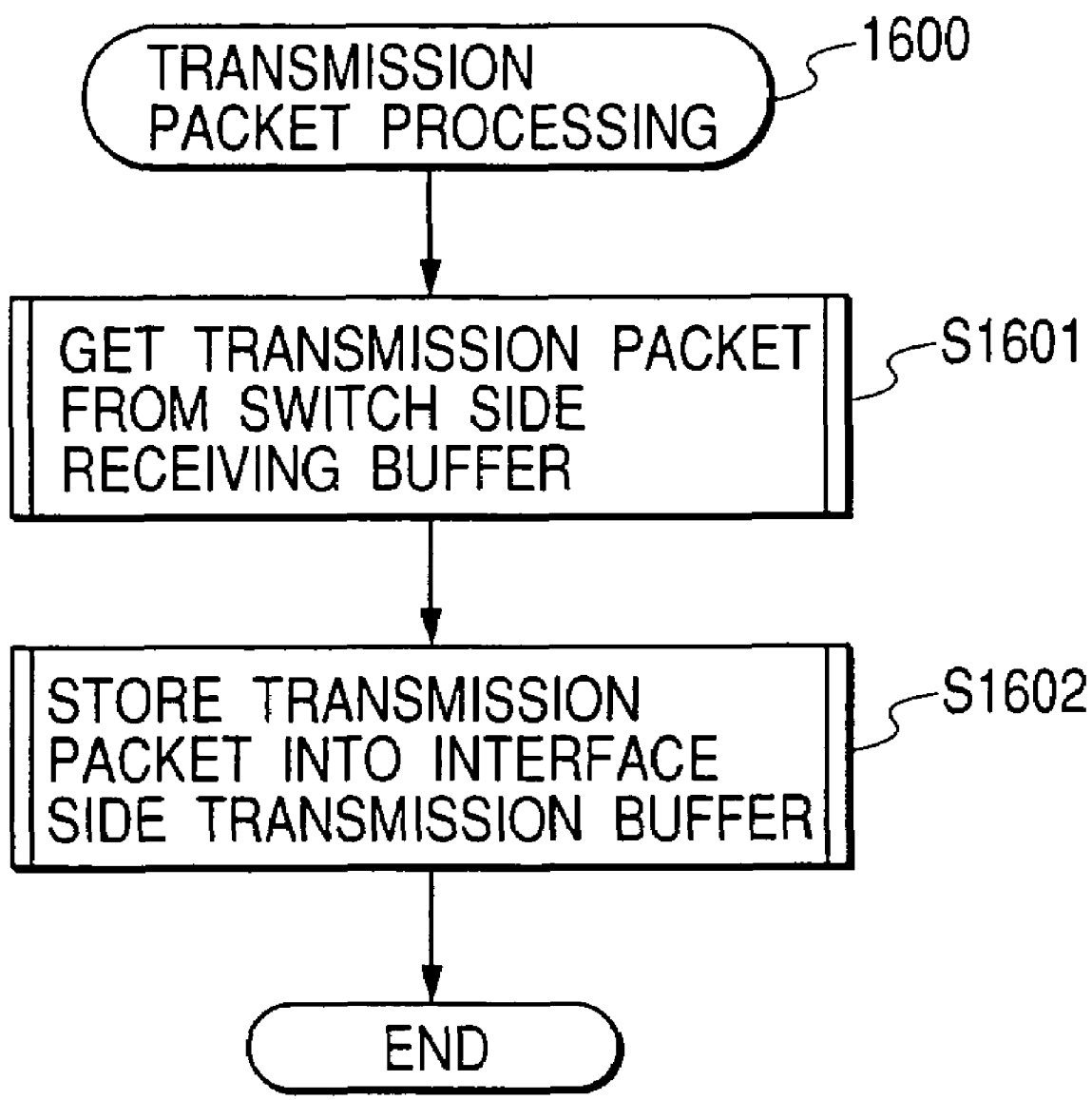
FIG. 17 is a flowchart showing an example of a transmission packet processing routine 1600 executed by the access line protocol processor 81A.

FIG. 17 shows the flowchart of a transmission packet processing routine 1600 executed by the CPU 811 of the access line protocol processor 81A.

In the routine 1600, the transmission packet in the format shown in FIG. 12 is taken out from the switch side receiving buffer 815 (S1601) and transferred to the interface side transmission buffer 814 (S1602), and the process is finished. By repeating the execution of the routine 1600, both the IP packet including the HTTP response message transmitted form the Web cache server 113 and the IP packet for the user terminal received from the IP network 105 side can be transferred to the access line interface 80A.

The access line interface 80A removes the internal routing information 1010 and the PPP connection ID 1001 from the packet received from the access line protocol processor 81A and transmits the PPP frame to the access line 102 connected to the access line interface 80A. For example, when a plurality of connections are multiplexed on one access line 102 like an ATM line, the PPP frame 1103 is transmitted to the connection specified by the PPP connection ID 1001.

Figure 18:
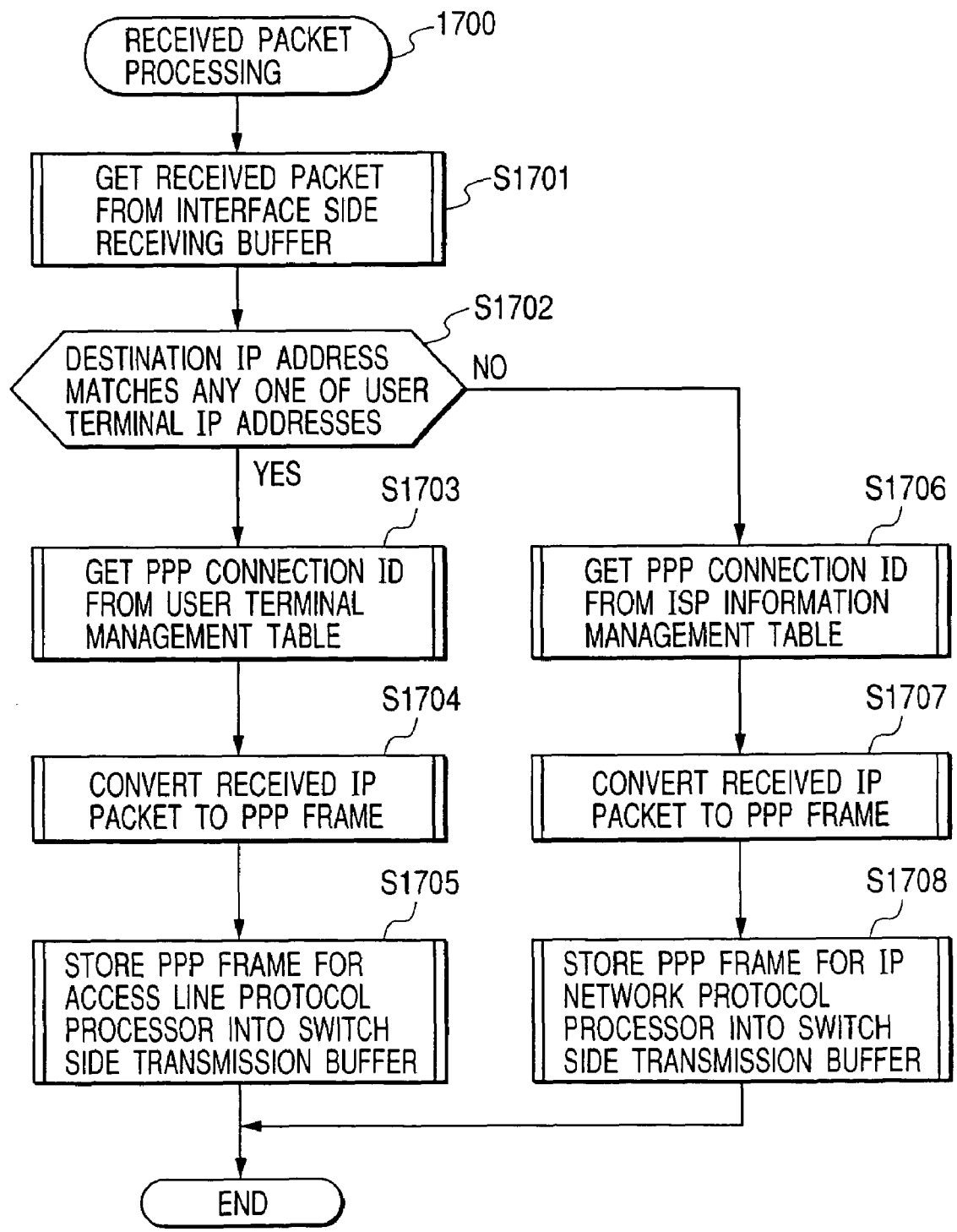
FIG. 18 is a flowchart showing an example of a received packet processing routine 1700 executed by the cache server protocol processor 81B.

FIG. 18 shows the flowchart of a received packet processing routine 1700 executed by the CPU of the Web cache server protocol processor 81B.

In the routine 1700, a received packet having the format shown in FIG. 11C or 11D is taken out from the interface side receiving buffer 813 (S1701). Since the IP packet transmitted from the Web cache server is not associated with the PPP connection, as the PPP connection ID 1001, a magic number indicative of an unspecified PPP connection is added to the packet get from the buffer 813.

In the routine 1700, next, the destination address included in the IP header 1005 of the received packet is compared with the user terminal IP addresses 831 registered in the user terminal information management table 830 (S1702). When the destination address coincides with any of the user terminal IP addresses, the PPP connection ID 832 is read out from an entry corresponding to the destination address in the user terminal management table 830 (S1703) and, the received IP packet is converted into the PPP frame in accordance with the LCP configuration option information 834 of the entry (S1704). After that, the PPP connection ID obtained in step S1703 and the internal routing information designating the access line protocol processor 81A are added to the PPP frame, and the resultant is stored in the frame format shown in FIG. 12 into the switch side transmission buffer 815 (S1705).

When the user terminal IP address 831 coinciding with the destination address is not found in the user terminal information management table 830, an entry having an IP address 842 assigned to the cache server which coincides with the source address of the received IP packet is retrieved from the ISP information management table 840 in order to obtain the PPP connection ID 844 from the entry (S1706). Next, the received IP packet is converted to the PPP frame in accordance with the LCP configuration option information 845 of the entry (S1707), the PPP connection ID obtained in step S1706 and the internal routing information designating the IP network protocol processor 81C are added to the PPP frame, and the resultant is stored in the frame format shown in FIG. 12 into the switch side transmission buffer 815 (S1708).

By the above processes, among the IP packets transmitted from the Web cache server 113, the IP packet for the user terminal including the HTTP response message can be transmitted to the access line protocol processor 81A and the IP packet for the Web server including the HTTP request message can be transmitted to the IP network protocol processor 81C.

Figure 19:
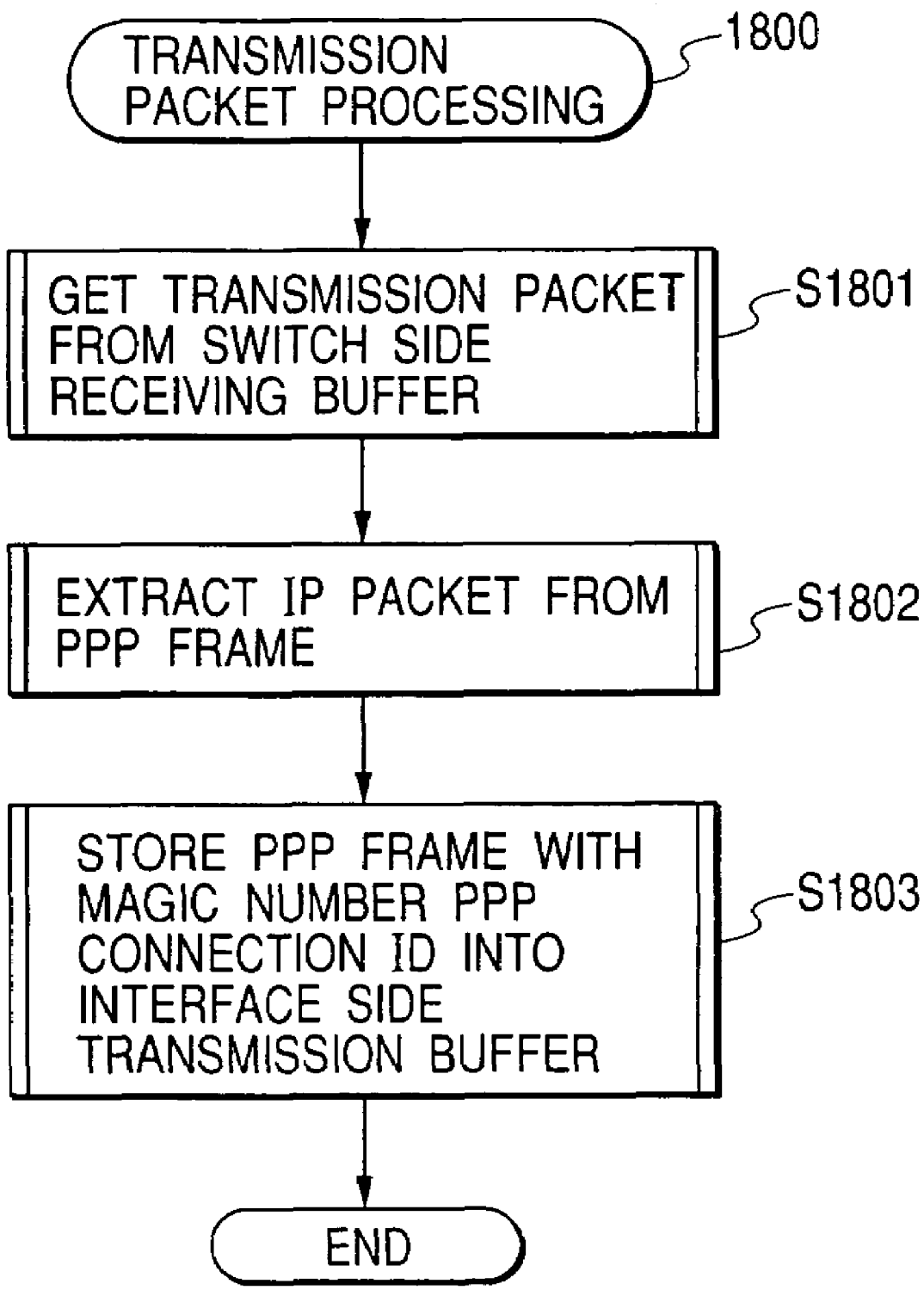
FIG. 19 is a flowchart showing an example of a transmission packet processing routine 1800 executed by the cache server protocol processor 81B.

FIG. 19 shows the flowchart of a transmission packet processing routine 1800 executed by the CPU of the cache server protocol processor 81B.

In the routine 1800, a transmission packet having the format shown in FIG. 12 is taken out from the switch side receiving buffer 816 (S1801) and an IP packet is extracted from the PPP frame 1103 (S1802) After that, a magic number indicative of an unspecified PPP connection is added as the PPP connection ID 1001 to the IP packet, and the resultant is transferred to the interface side transmission buffer (S1803). By the processing routine, the HTTP request message received from the access lines 102-1 to 102-m and the HTTP response message received from the IP network 105 can be transferred to the Web cache server 113.

Figure 20:
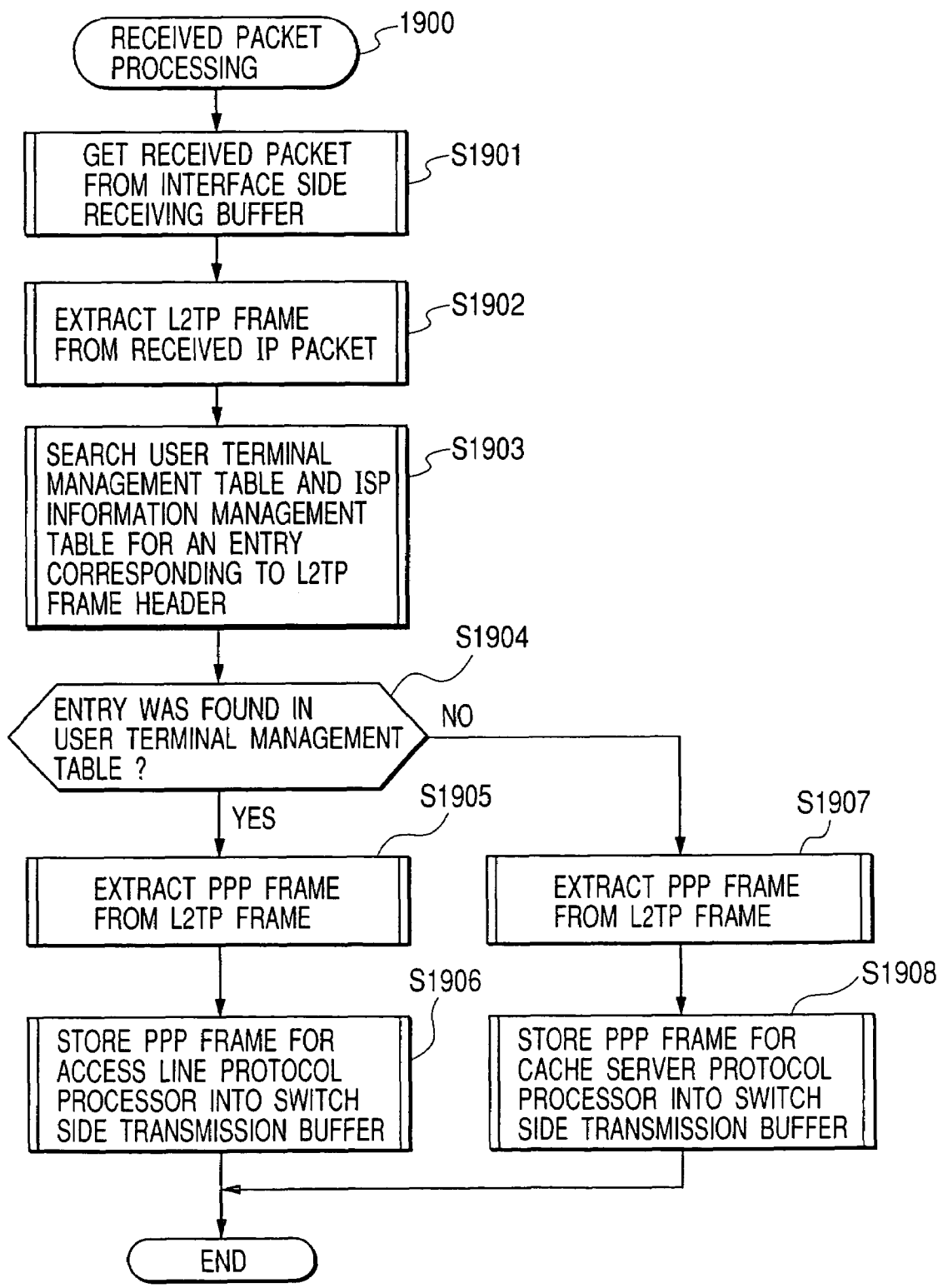
FIG. 20 is a flowchart showing an example of a received packet processing routine 1900 executed by the IP network protocol processor 81C.

FIG. 20 shows a flowchart 1900 of a received packet processing routine executed by the CPU of the IP network protocol processor 81C.

In the routine 1900, first, an IP packet is taken out from the interface side receiving buffer 813 (1901). Each packet accumulated in the interface side receiving buffer 813 in the IP network protocol processor 81C has, for example, an IP packet format having the IP header in its head portion like the packets 706 and 709 shown in FIG. 8. The IP network interface 80C for receiving the IP packet does not have a special function of extracting the PPP header from the received IP packet and checking the upper layer protocol. Consequently, the PPP connection ID 1001 added to each IP packet by the IP network interface 80C is a magic number indicative of the above-described unspecified PPP connection.

In the routine 1900, an IP packet is taken from the interface side receiving buffer 813, the IP header and UDP header are removed from the IP packet to extract an L2TP frame (S1902). Subsequently, the user terminal information management table 830 and the ISP information management table 840 are searched for an entry having L2TP connection information 835 or 846 which coincides with the tunnel ID and session ID indicated by the L2TP header of the L2TP frame (S1903).

In the case where the target entry is found in the user terminal information management table 830 (S1904), a PPP frame is extracted from the L2TP frame (S1905), the PPP connection ID 832 indicated by the entry and internal routing information designating the access line protocol processor 81A are added to the PPP frame, and the resultant is transferred in the frame format shown in FIG. 12 to the switch side transmission buffer 815 (S1906).

When the target entry is found in the ISP management information table 840, a PPP frame is extracted from the L2TP frame (S1907), the PPP connection ID 844 indicated by the entry and the internal routing information 1010 designating the cache server protocol processor 81B are added to the PPP frame, and the resultant is transferred in the format shown in FIG. 12 to the switch side transmission buffer 815 (S1908).

By the processes, among packets received from the IP network, the PPP frame including the HTTP response message transmitted from the Web server 111 to the Web cache server 113 is transferred to the Web cache server 113, and the other PPP frames can be transferred toward the access lines corresponding to the destination user terminals 101-1 to 101-m.

Figure 21:
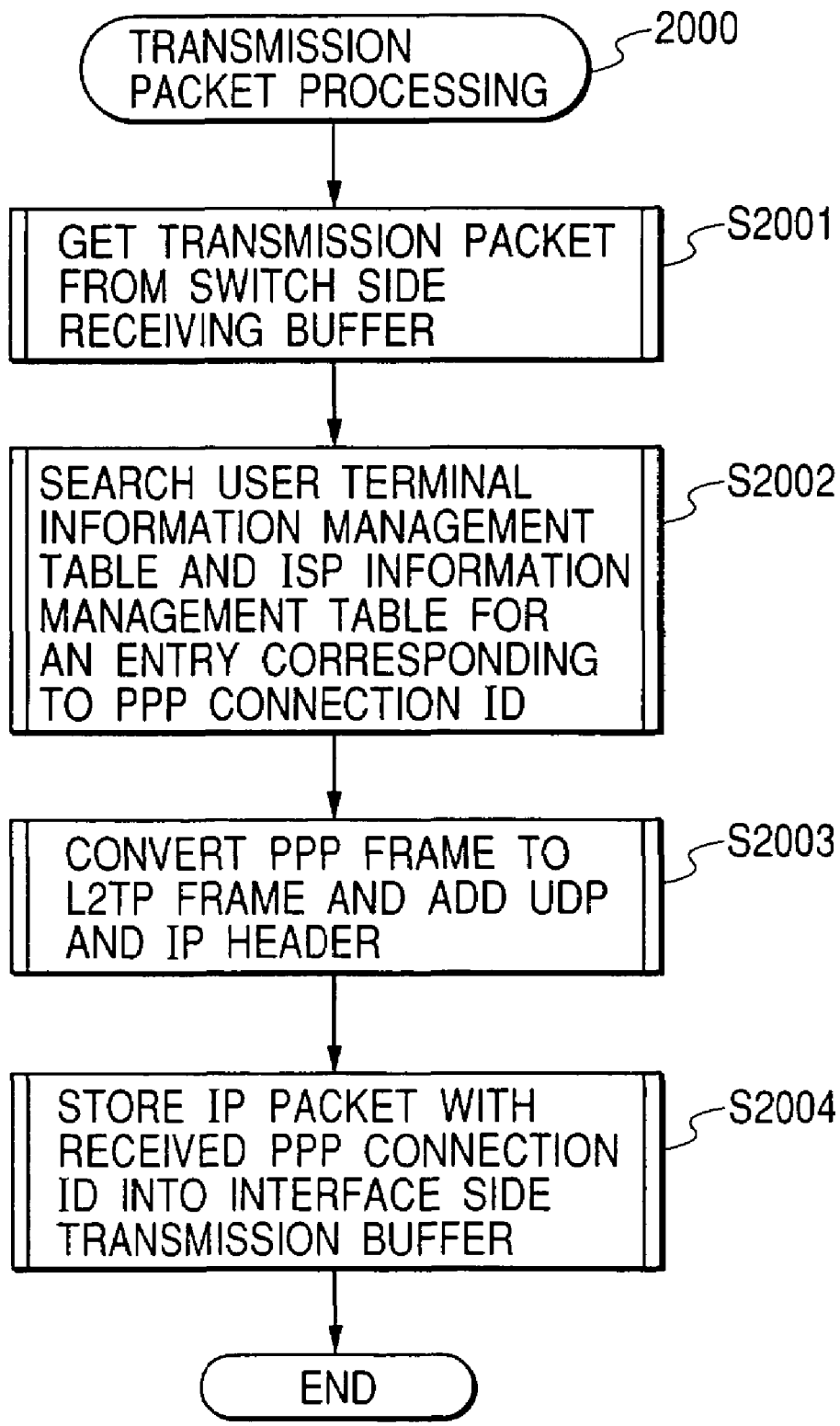
FIG. 21 is a flowchart showing an example of a transmission packet processing routine 2000 executed by the IP network protocol processor 81C.

FIG. 21 shows the flowchart of a transmission packet processing routine 2000 executed by the CPU of the IP network protocol processor 81C.

In the routine 2000, a transmission packet in the format shown in FIG. 12 is taken out from the switch side receiving buffer 816 (S2001), and the user terminal information management table 830 and ISP information management table 840 are searched for an entry having the PPP connection ID 832 or 844 coinciding with the PPP connection ID 1001 added to the transmission packet (S2002).

When the target entry is found, by applying the values of the tunnel ID and session ID indicated by the L2TP connection information 835 or 846 of the entry, an L2TP header is generated. The L2TP header, UDP header, and IP header are added to the transmission PPP frame 1103, thereby forming an IP packet (S2003). After that, the PPP connection ID 1001 is added to the IP packet and the resultant is transferred to the interface side transmission buffer 814 (S2004).

By the above processes, packets each including the HTTP request message transmitted from the Web cache server 113 and packets other than packets for Web traffic transmitted from the user terminals 101-1 to 101-m can be transferred to their destinations via proper L2TP connections on the regional IP network.

Referring now to FIGS. 22 to 27, a second embodiment of the invention will be described.

The second embodiment is characterized in that a gateway apparatus serving as the LAC 104 has the function of forcedly transferring packets for a Web server (Web traffic) transmitted from user terminals to a Web cache server.

FIG. 22A shows a packet transfer sequence used in the case where contents data designated by an URL exists in the Web cache server 113 in the second embodiment, and FIG. 22B shows the relation between the destination address DA and the source address SA of an IP header attached to each of transfer packets illustrated in FIG. 22A.

When the user designates the URL of contents data to be obtained to a Web browser application operating on the user terminal 101-1, a PPP frame 710 including the HTTP request message is generated and transmitted from the user terminal 101-1 to the access line 102-1 (S1010) In the embodiment, the destination address of an IP header IP(a) of the PPP frame 710 is the IP address of the Web server 111.

When the PPP frame 710 including the HTTP request message is received, the LAC 104 rewrites the destination address of the IP header to the IP address of the Web cache server 113 (S1041), and transfers the resultant as an IP packet 702 to the Web cache server 113.

When the IP packet 702 is received from the LAC 104, in a manner similar to the first embodiment described by referring to FIG. 7A, the Web cache server 113 extracts the HTTP request message from the data field, and retrieves the contents data designated by the URL from the cache data (S1131) When the designated contents data is found, an HTTP response message including the contents data is generated (S1132), and an IP packet 703 in which the HTTP response message is set in the data field and the IP address of the requester user terminal 101-1 is set as the destination address is transmitted to the LAC 104.

When the IP packet 703 is received from the Web cache server 113, the LAC 104 rewrites the source address of the IP header to the destination address of the packet 710, that is, the IP address of the Web server 111 requested by the user for the contents data (S1042), converts the IP packet 703 into a PPP frame 712, and transfers the PPP frame 712 to the access line 102-1.

Figure 23A:
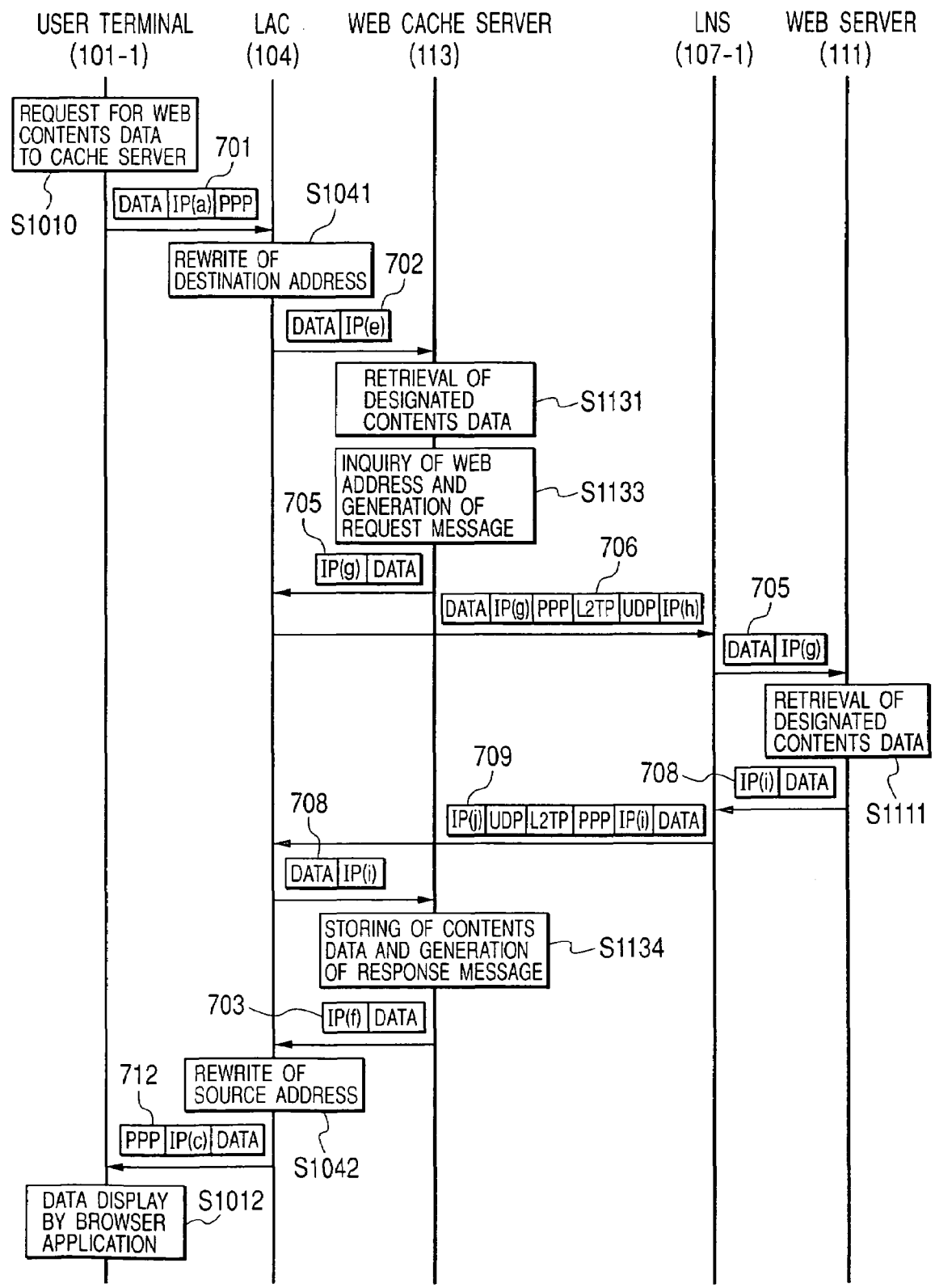
FIG. 23A shows a packet transfer sequence used in the case where Web contents data requested by the user terminal does not exist in the cache server in an ISP selection type network system to which the gateway apparatus of the second embodiment of the invention is applied as an LAC.

FIG. 23A shows, a packet transfer sequence in the second embodiment used in the case where contents data designated by an HTTP request message does not exist in the Web cache server 113. FIG. 23B shows the relation between the destination address DA and the source address SA of an IP header attached to each of transfer packets illustrated in FIG. 23A.

Steps S1010 to S1131 are the same as those in FIG. 22A. As a result of the search for the contents by the Web cache server 113 (S1131), when the contents data designated by the URL does not exist in cache data, by a procedure similar to that in the first embodiment described by referring to FIG. 8A, an IP packet 705 including the HTTP request message is transmitted from the Web cache server 113 to the Web server 111, an IP packet 709 having an HTTP response message including the designated contents is returned from the Web server 111 to the Web cache server 113, and the IP packet 703 including the HTTP response message for the user terminal 101-1 is transmitted from the Web cache server 113 to the LAC 104.

When the IP packet 703 is received from the Web cache server 113, similarly to FIG. 22A, the LAC 104 rewrites the source address of the IP header to the IP address of the Web server 111 (S1042), converts the IP packet 703 into the PPP frame 712, and transfers the PPP frame 712 to the access line 102-1.

To perform the above packet transfer, in the gateway apparatus of the second embodiment, among the plurality of protocol processors 81A to 81C shown in FIG. 9, the access line protocol processor 81A has the HTTP request message management table 850 shown in FIG. 10.

The destination address of the IP header in the PPP frame including the HTTP request message transmitted from the user terminals 101-1 to 101-m is rewritten to the IP address of the Web cache server 113 by the access line protocol processor 81A and, after that, the resultant is transferred to the Web cache server 113. With respect to an IP packet including the HTTP response message obtained from the Web server by the Web cache server 113 in place of the user terminal, in the access line protocol processor 81A, the source address of the IP header is rewritten into the destination address of the HTTP request message issued by the user terminal and, after that, the resultant is transferred to the user terminal.

The HTTP request message management table 850 is referred to when the source IP address of the HTTP response message is rewritten to the destination IP address of the HTTP request message issued by the user terminal. For example, as shown in FIG. 24, the HTTP request message management table 850 stores for each HTTP request message received from a user terminal, a TCP/UDP source port number 852 and a destination IP address 853 of the message in association with a PPP connection ID 851 of the PPP frame of the message.

FIG. 25 shows the flow of packet data in an LAC in the second embodiment.

By designating the same reference numerals as those in FIG. 15 to packets common to those in the first embodiment, their description will not be repeated.

When the PPP frame is received from the access line, the access line protocol processor 81A identifies an upper layer protocol of the PPP. When the upper layer protocol is the LCP, an LCP process is executed. When the upper layer protocol is the NCP, an NCP process is executed.

When the upper layer protocol is the IP, the destination port number of the TCP/UDP header is checked. If the destination port number is, for example, "80" as a well-known port number of the HTTP, in order to transfer the received packet (HTTP request message) to the cache server 113, a destination IP address converting process 1509 is executed to rewrite the destination address of the IP header to an IP address value of the Web cache server. The received packet subjected to the address conversion is transmitted to the internal switch unit 87 in a form that the internal routing information 1010 designating the cache server protocol processor 81B is added in front of the PPP connection ID 1001. In a manner similar to the first embodiment shown in FIG. 15, the packet is transferred as the IP packet 702 to the cache server 113 via the cache server protocol processor 81B.

A received packet having the upper layer protocol which is not the LCP, NCP, nor IP or an IP packet having the destination port number which is not "80" is transmitted in a form that the internal routing information 1010 designating the IP network protocol processor 81C is added, to the internal switch unit 87.

When the IP packet 702 is received, the cache server 113 searches the cache data for the contents data designated by the URL of the HTTP request message and, according to a search result, generates the IP packet 703 including the HTTP response message for the user terminal or the IP packet 705 including the HTTP request message for the Web server 111.

Each of the IP packets is processed by the cache server protocol processor 81B in accordance with the destination IP address. The packet for the HTTP response message having the IP address for the user terminal is transferred to the access line protocol processor 81A. The packet for the HTTP request message having the IP address for the Web server is transferred to the IP network protocol processor 81C. The operation of the cache server protocol processor 81B and that of the IP network protocol processor 81C are similar to those in the first embodiment.

The source IP address of the IP packet 703 including the HTTP response message transmitted from the cache server 113 is rewritten to the IP address of the Web server by a source IP address converting process 1613 executed by the access line protocol processor 81A. After that, the resultant is transferred as the PPP packet 712 to the requester user terminal.

Figure 26:
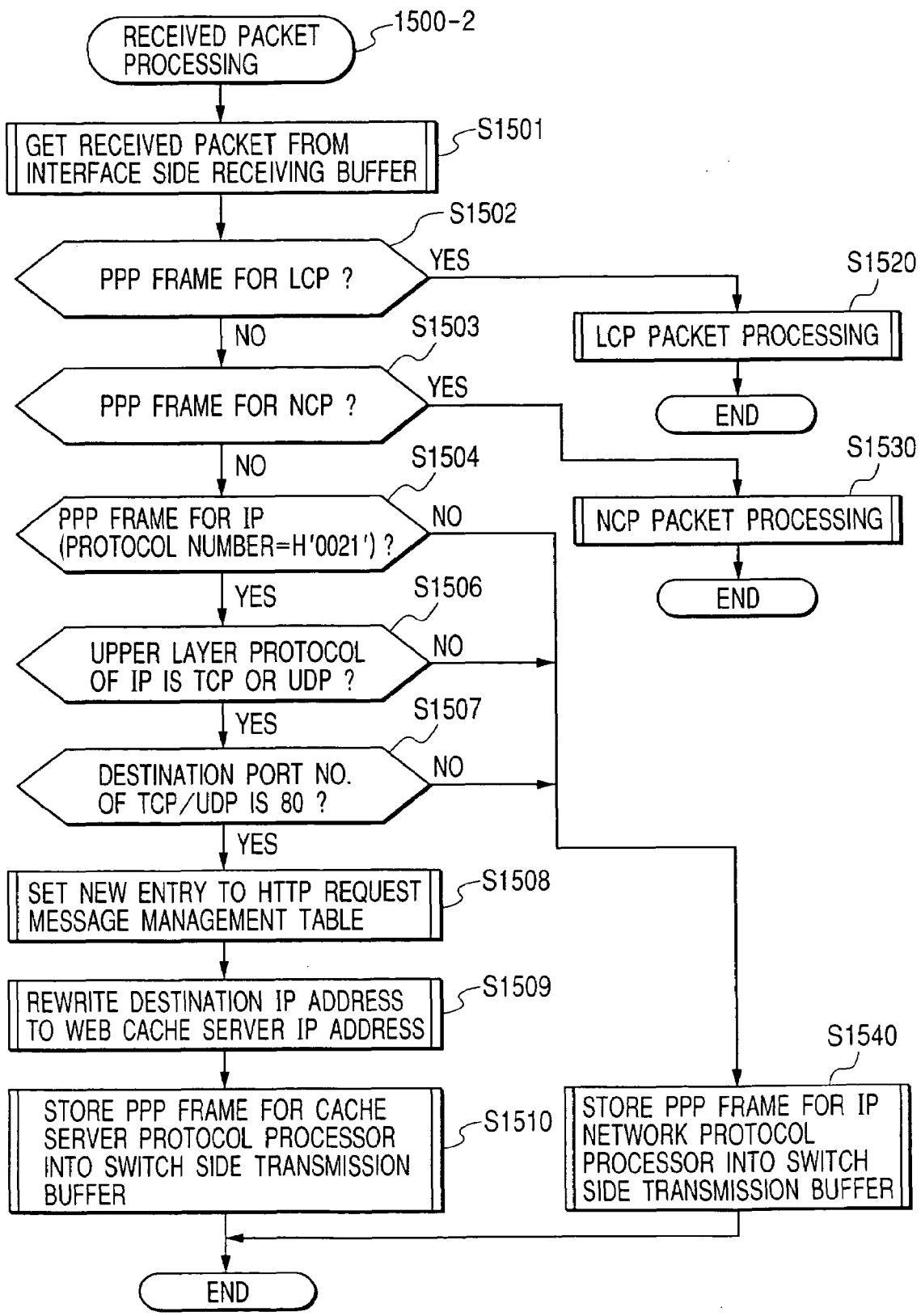
FIG. 26 is a flowchart showing an example of a received packet processing routine 1500-2 executed by the access line protocol processor 81A in the gateway apparatus of the second embodiment of the invention.

FIG. 26 shows the flowchart of a received packet processing routine 1500-2 executed by the CPU of the access line protocol processor 81A. Since processing steps having the same reference numerals as those in FIG. 16 are common to those in the first embodiment, the description will not be repeated.

When the upper layer protocol of the received PPP frame is the IP (S1504), the upper layer protocol of the IP is determined (S1506). If the upper layer protocol of the IP is the TCP or UDP, the TCP/UDP destination port number is identified (S1507). If the destination port number is "80" as a well-known port number of the HTTP, the received PPP frame is determined as a frame for Web traffic, the following process is performed.

First, a new entry indicating the relations of a connection ID of the received PPP frame, TCP/UDP source port number, and a destination address is generated and set in the HTTP request message management table 850 (S1508). Subsequently, the destination address of the IP header of the received PPP frame is rewritten to the IP address of the Web cache server (S1509). At this time, accompanying the rewriting of the destination address, a header check sum included in the IP header and an FCS (Frame Check Sequence) of the PPP frame are recalculated so as to be updated. Finally, the PPP connection ID 1001 and the internal routing information 1010 designating the Web cache server protocol processor 81B are added to the received PPP frame, the resultant is stored into the switch side transmission buffer 815 (S1510), and the process is terminated.

When the protocol of the PPP Frame is not the IP, when the protocol is the IP but the upper layer protocol is not the TCP nor UDP, or when the protocol is the TCP/UDP but the destination port number is not "80", the received PPP frame is determined as a frame which is not for Web traffic. The PPP connection ID 1001 and the internal routing information 1010 designating the IP network protocol processor 81C are added, and the resultant is stored in the switch side transmission buffer 815 (S1540)

By the above processes, the PPP frame including the HTTP request message transmitted from the user terminals 101-1 to 101-*m* to the Web server can be separated from the PPP connection and transferred to the Web cache server.

FIG. 27 shows the flowchart of a transmission packet processing routine 1600-2 executed by the CPU of the access line protocol processor 81A.

In the routine, a transmission PPP frame is taken out from the switch side receiving buffer 816 (S1611) the HTTP request message management table 850 is referred to on the basis of the PPP connection ID 1001 added to the transmission PPP frame and the destination port number extracted from the TCP/UDP header in the IP packet included in the transmission PPP frame, and an entry having the PPP connection ID and the source port number 852 coinciding with the PPP connection ID and destination port of the transmission PPP frame is retrieved (S1612).

The value of the destination IP address 853 of the HTTP request message is obtained from the retrieved entry, and the source IP address of the IP packet included in the transmission PPP frame is rewritten to the value of the destination IP address (S1613). At this time, the header check sum of the IP header and the FCS of the PPP frame are recalculated so as to be updated. The PPP connection ID 1001 is added to the transmission PPP frame in which the destination IP address is rewritten, and the resultant is stored into the interface side transmission buffer 814 (S1614).

The PPP frame stored in the transmission buffer 814 is transferred to the access line interface 80A where the PPP connection ID 1001 is removed, and the resultant is transmitted to the line to which the requester user terminal is connected.

In the foregoing embodiment, by assigning a plurality of IP addresses corresponding to a plurality of ISPs connected to a regional IP network to a single Web cache server connected to the LAC, the same Web cache server can respond to the user as a transmission source of an HTTP request message subscribing any of the ISPs. As a modification of the invention, it is also possible to connect a plurality of Web cache servers associated with different ISPs to the LAC and selectively distribute an IP packet for Web traffic to a Web cache server corresponding to the ISP of the source user.

As obviously understood from the above embodiments, the gateway apparatus of the invention has the function of relaying an IP packet via a PPP connection and the function of separating an IP packet for Web traffic from the PPP connection. Consequently, by using the gateway apparatus as an LAC in an ISP selection type access network system and connecting a Web cache server to the gateway apparatus, IP packets for Web traffic can be selectively separated from a packet stream passing through the LAC to bypath them to the Web cache server.

According to the invention, in response to an HTTP request from the user, a Web cache server can return a response message in place of a Web server providing the contents. Thus, the traffic in a regional IP network (Internet access network) connecting the LAC and ISP networks can be lessened, and there is an advantage for the user that response to a Web server access is improved.

What is claimed is:

1. A gateway apparatus connected to a web cache server, a plurality of user terminals and an intermediate network accommodating at least one ISP (Internet Service Provider) network connected to the Internet, said gateway apparatus comprising:

a plurality of line interfaces each for communicating PPP (Point to Point Protocol) packets with one of said user terminals;

a cache server interface for communicating with said web cache server; and a packet transfer controller for extracting an IP (Internet Protocol) packet from a web traffic PPP packet received by any one of said line interfaces, transferring the IP packet to said web cache server via said cache server interface, and transferring a response IP packet received from said web cache server via said cache server interface to one of said user terminals, after converting the response IP packet into a Web traffic PPP packet, wherein one of said user terminals is the sender of said web traffic PPP packet.

2. The gateway apparatus according to claim 1, wherein said packet transfer controller is configured to discriminate said web traffic PPP packet from among PPP packets received by said line interfaces based on header information of each of the PPP packets.

3. The gateway apparatus according to claim 1, wherein said IP packet extracted from said web traffic PPP packet includes an HTTP (Hyper Text Transfer Protocol) request message designating a URL (Uniform Resource Identifier), and said response IP packet received from said Web cache server includes an HTTP response message for sending contents data specified by the URL to said user terminal.

4. The gateway apparatus according to claim 2, wherein said IP packet extracted from said web traffic PPP packet includes an HTTP (Hyper Text Transfer Protocol) request massage designating a URL (Uniform Resource Identifier), and said response IP packet received from said web cache server includes an HTTP response message for sending contents data specified by the URL to said user terminal.

5. The gateway apparatus according to claim 1, wherein said packet transfer controller includes means for selectively transferring said response IP packet received from said web cache server to said intermediate network after converting the response IP packet into a PPP packet.

6. The gateway apparatus according to claim 2, wherein said packet transfer controller includes means for selectively transferring said response IP packet received from said web cache server to said intermediate network after converting the response IP packet into a PPP packet.

* * * * *